US012653081B2

(12) United States Patent
Sivinski et al.

(10) Patent No.: US 12,653,081 B2
(45) Date of Patent: Jun. 16, 2026

(54) STRIPTILL ROW UNIT

(71) Applicant: Harvest International, Inc., Storm Lake, IA (US)

(72) Inventors: Jeffrey Alan Sivinski, Cherokee, IA (US); Byron James Friesen, Storm Lake, IA (US)

(73) Assignee: Harvest International, Inc., Storm Lake, IA (US)

( * ) Notice: Subject to any disclaimer, the term of this patent is extended or adjusted under 35 U.S.C. 154(b) by 426 days.

(21) Appl. No.: 18/341,939

(22) Filed: Jun. 27, 2023

(65) Prior Publication Data

US 2025/0000001 A1    Jan. 2, 2025

(51) Int. Cl.
| | |
|---|---|
| *A01B 15/18* | (2006.01) |
| *A01B 35/08* | (2006.01) |
| *A01B 35/16* | (2006.01) |
| *A01B 43/00* | (2006.01) |
| *A01B 49/02* | (2006.01) |
| *A01B 49/06* | (2006.01) |
| *A01B 63/00* | (2006.01) |

(Continued)

(52) U.S. Cl.
CPC .............. *A01B 49/06* (2013.01); *A01B 15/18* (2013.01); *A01B 35/08* (2013.01); *A01B 35/16* (2013.01); *A01B 43/00* (2013.01); *A01B 49/027* (2013.01); *A01B 63/008* (2013.01); *A01B 73/04* (2013.01); *A01B 73/065* (2013.01)

(58) Field of Classification Search
CPC ......... A01B 15/18; A01B 35/08; A01B 35/16; A01B 43/00; A01B 49/027; A01B 49/06; A01B 63/008; A01B 73/04; A01B 73/065
See application file for complete search history.

(56) References Cited

U.S. PATENT DOCUMENTS

| | | | | |
|---|---|---|---|---|
| 3,038,424 A | * | 6/1962 | Johnson ............... | A01C 23/025 |
| | | | | 111/152 |
| 4,592,294 A | * | 6/1986 | Dietrich, Sr. .......... | A01C 5/062 |
| | | | | 111/156 |

(Continued)

FOREIGN PATENT DOCUMENTS

| | | |
|---|---|---|
| EP | 3349560 B1 | 6/2021 |
| RU | 2570327 C1 | 12/2015 |
| WO | 2021194346 A1 | 9/2021 |

OTHER PUBLICATIONS

Unverferth Manufacturing Company, Inc., "Ripper-Stripper Strip-Till Tillage Tool, Models 332 and 312," Product Brochure, 2019, 10 pages.

*Primary Examiner* — Matthew R Buck

(74) *Attorney, Agent, or Firm* — McKee, Voorhees & Sease, PLC

(57) ABSTRACT

A striptill row unit includes a trash cleaner assembly, a coulter assembly, a knife assembly, a berm disc assembly, and a firming wheel assembly. The berm disc and firming wheel assemblies are independently movable between a raised transport position and a lowered field position. The knife assembly includes downwardly angled wings with leading edges extending substantially perpendicular to the line of travel of the row unit. Up/downforce systems are provided for various assemblies, with an independent actuator for each system. The berm discs are adjustable vertically, laterally, and angularly.

6 Claims, 31 Drawing Sheets

(51) Int. Cl.
    *A01B 73/04*       (2006.01)
    *A01B 73/06*       (2006.01)

(56)           References Cited

U.S. PATENT DOCUMENTS

| 4,711,187 | A | * | 12/1987 | Schultz | A01C 23/025 |
| | | | | | 172/699 |
| 5,271,342 | A | * | 12/1993 | Neidhardt | A01C 23/025 |
| | | | | | 111/119 |
| 5,398,771 | A | * | 3/1995 | Hornung | A01C 7/208 |
| | | | | | 172/635 |
| 5,495,814 | A | * | 3/1996 | Primus | A01C 7/06 |
| | | | | | 172/732 |
| 5,640,914 | A | | 6/1997 | Rawson | |
| 6,397,767 | B1 | * | 6/2002 | Dietrich, Sr. | A01C 23/022 |
| | | | | | 111/119 |
| 6,860,336 | B2 | * | 3/2005 | Robillard | A01B 15/025 |
| | | | | | 172/699 |
| 6,997,121 | B2 | * | 2/2006 | Buchholtz | A01B 49/06 |
| | | | | | 172/699 |
| 7,866,270 | B2 | * | 1/2011 | Ankenman | A01C 7/203 |
| | | | | | 172/138 |
| 8,006,775 | B2 | | 8/2011 | Steinlage et al. | |
| 8,393,407 | B2 | | 3/2013 | Freed | |
| 9,148,989 | B2 | * | 10/2015 | Van Buskirk | A01C 5/066 |
| 10,019,018 | B2 | | 7/2018 | Hulin | |
| 10,426,076 | B1 | * | 10/2019 | Rosenboom | A01B 5/04 |
| 10,687,458 | B2 | | 6/2020 | Pfitzner | |
| 10,721,855 | B2 | | 7/2020 | Bassett | |
| 11,076,522 | B2 | * | 8/2021 | Kovach | A01B 15/06 |
| 11,109,524 | B2 | | 9/2021 | Petenon et al. | |
| 11,185,008 | B2 | | 11/2021 | Sivinski | |
| 11,262,344 | B2 | | 3/2022 | Schoeny | |
| 11,284,557 | B2 | | 3/2022 | Schoeny et al. | |
| 11,477,937 | B2 | | 10/2022 | Hodel et al. | |
| 2021/0037689 | A1 | | 2/2021 | Ihde | |
| 2022/0210962 | A1 | * | 7/2022 | Martin | A01B 63/24 |
| 2022/0225561 | A1 | | 7/2022 | Sivinski et al. | |

* cited by examiner

STRIPTILL ROW UNIT

TECHNICAL FIELD

The invention is directed toward a striptill row unit having a floating trash clearing assembly, a coulter assembly, an inline knife, folding berm discs, and a folding soil forming wheel.

BACKGROUND

Striptilling is an agricultural conservation system that minimizes field tillage. The striptill process combines the conventional tillage benefits of soil drying and warming with the soil-protecting advantages of no-till, by tilling only spaced apart rows in the field where seed will be planted.

Various striptill systems are commercially available, but historically have seen limited use. In recent years, environmental concerns relating to water and air quality have made the use of striptill systems more common in crop farming operations. For example, conventional striptill row units utilize fluted or wave coulters, deep shank systems, trash cleaners, and rolling baskets.

Coulter striptill systems till the soil and mix the soil with fertilizer. These coulter systems are problematic if soil conditions are not ideal, since they do not thoroughly till the soil and leave weeds and foliage strips. These coulter systems also produce dirt clods or lumps of dislodged soil, which the forming wheel or rolling basket cannot crush or crumble into preferred soil structure for the seeds that will later be planted in a separate pass through the field. Conventional coulter striptill systems also require aggressive downforce on the fluted or wave coulter to cut through trash and hard soils during the tilling process. Fluted coulters also create vertical soil compaction due to the heavy downforce required to maintain the coulters at a proper depth in the soil. The downforce is greater in fields that have high levels of crop residue from the previous year's harvest.

Shank type fertilizer knife systems used in conventional striptilling operate at a soil depth of 8-12 inches. Thus, these shank type fertilizer systems require a tractor with high horsepower to pull the system through the field. These tractors are very fuel inefficient, and increase the risk of soil erosion through the air and water drainage systems of the fields. These shank knife fertilizer systems also deposit the fertilizer in a deep band spaced apart from the planted crop roots so as to avoid creation of a "hot" zone having high salt content, which can cause root damage on immature crops. Operating the striptill shank at the deep soil depth also increases the risk of the soil drying out to a deeper depth, thus losing valuable soil moisture needed by the crops.

Accordingly, improved strip tilt row units are needed which overcome the problems of the prior art.

Accordingly, a primary objective of the present invention is the provision of a striptill row unit assembly which overcomes the problems of the prior art.

Another objective of the present invention the provision of an agricultural striptill row unit wherein the berm discs and forming wheel are foldable between field and transport positions.

A further objective of the present invention is the provision of an agricultural striptill row unit having an in-line knife having opposing wings extending laterally outwardly with a leading edge that is substantially perpendicular to the line of travel for the row unit.

Another objective of the present invention is the provision of a striptill row unit having a trash cleaner, a coulter assembly, fertilizer knife, berm discs, and a firming wheel, with first, second, and third up/downforce systems which independently operate the coulter assembly, the berm discs, and the forming wheel, respectively.

Still another objective of the present invention is the provision of an agricultural striptill row unit having berm discs which are adjustable relative to one another as to vary the soil berm built by these discs.

These and other objectives become apparent from the following description of the invention.

SUMMARY

The striptill row unit of the invention includes five components defining five separate and distinct tillage zones. A floating trash cleaner is mounted on the front of the striptill row unit, and has hydraulic up/downforce control for accurate trash clearing of the strip to be tilled. Different trash cleaners can be interchanged to accommodate different angles, different row spacing, light or heavy trash conditions, and different cleaning disc blades.

A coulter assembly follows the trash cleaner, and has adjustable cutting depth via an arm which is independent of the gauge wheel and tillage shank. The cutting depth can be adjusted depending on crop residue on the soil surface, to preclude buildup of crop residue on the in-line tillage knife. The coulter assembly has a hydraulic up/downforce system to facilitate proper penetration of the coulter of the wheel based upon soil hardness or softness. Depth of the coulter is controlled by a gauge wheel adjacent to the coulter, which also applies a slight side pressure on the smooth coulter to wipe away soil on the coulter.

Next, an in-line knife is mounted on a shank behind the coulter assembly. The knife tills the soil and dispenses fertilizer. The system also uses a hydraulic up/downforce system to maintain proper penetration of the knife in hard or soft soils.

Next, folding berm building discs are mounted behind the knife. The discs function to build a berm into which seed is planted in a subsequent operation, and to cover the applied fertilizer with soil. The discs have hydraulic up/down pressure to control the amount of force applied by the discs to the soil. The berm discs are foldable between a raised transport position and a lowered field or use position.

Lastly, a firming wheel resides behind the berm discs, and applies pressure or downforce on the soil berm via a hydraulic up/downforce system, thereby minimizing or preventing moisture loss and wind erosion. The firming wheel is also movable between a raised transport position and a lowered field or use position, independently from the folding berm discs.

DETAILED DESCRIPTION

Figure 1:
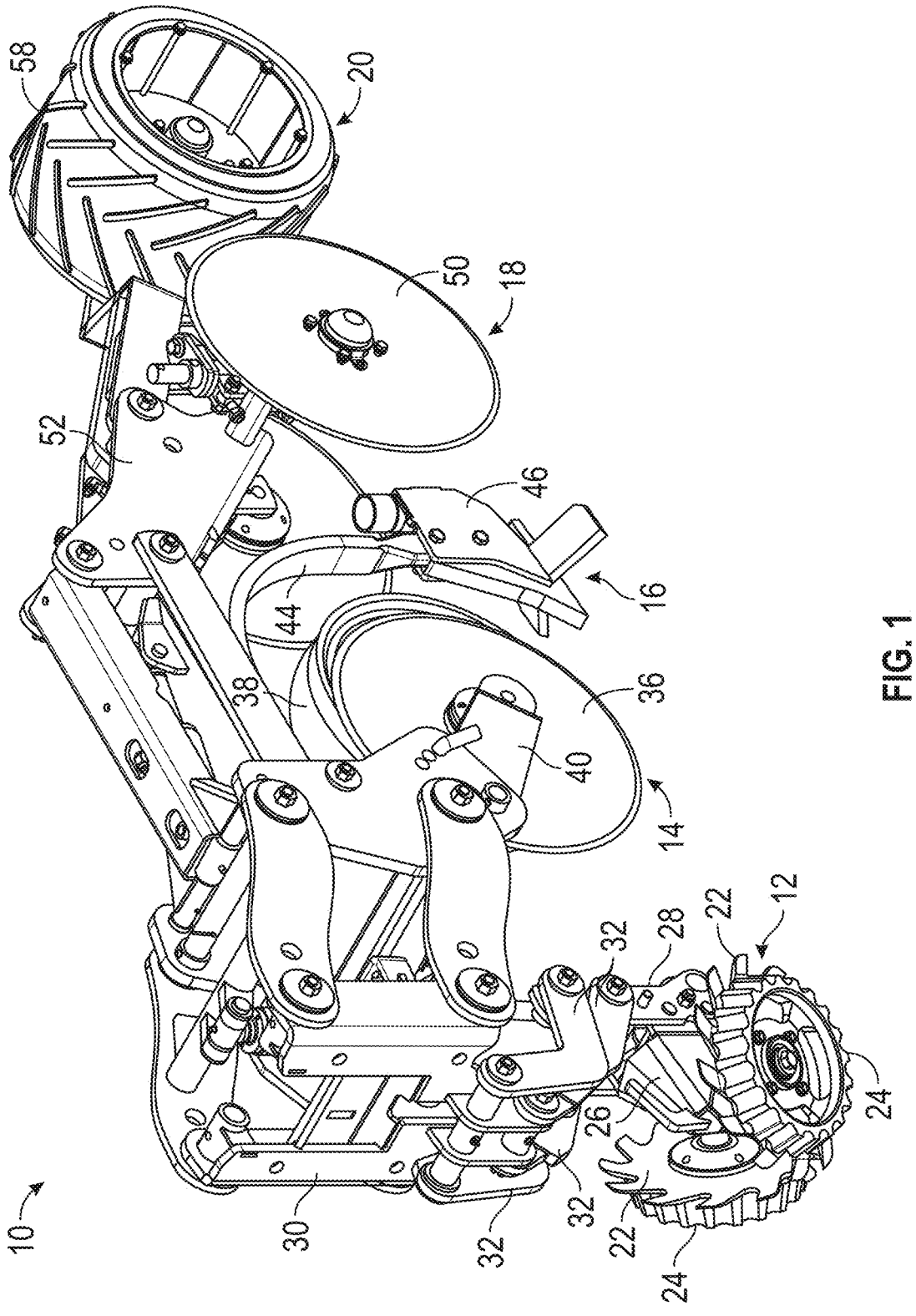
FIG. 1 is a left front perspective or isometric view of the agricultural striptill row unit, according to the present invention.

The As seen in FIGS. 1-7, the striptill row unit 10 of the invention includes five primary components. From front to back, the components of the row unit can include a trash cleaner assembly 12, a coulter assembly 14, a knife assembly 16, a berm disc assembly 18, and a firming wheel assembly 20.

The trash cleaner assembly 12 is similar to that shown and described in Applicant's U.S. Pat. No. 11,185,008, which is incorporated herein by reference. The trash cleaner assembly 12 includes a pair of discs 22 each having an associated gauge wheel 24. An actuator 34, provides up/downforce control for accurate trash clearing. The docking station 28 permits different row cleaner discs to be interchanged to accommodate different row spacing, light or heavy trash conditions, and different style discs, as desired by the farmer.

The coulter assembly 14 includes a smooth coulter blade 36 and a gauge wheel 38. Blade 36 is mounted on an arm 40 independently from the gauge wheel 38 to allow for adjustable depth of the blade 36. This adjustability of the blade accommodates different cutting depths, based upon the type and amount of crop residue on the soil surface. Proper residue cutting by the blade 36 minimizes or eliminates clogging up the knife assembly 16 with residue buildup. The coulter assembly 14 also includes an actuator 42 to control up/downforce so as to maintain proper penetration of the blade 36 in hard or soft soil. The gauge wheel 38 preferably engages the blade 36 with light pressure so as to wipe soil from the blade 36.

The knife assembly 16 includes a spring steel shank 44 mounted to the frame 30 of the row unit 10, and extending over and behind the coulter assembly 14. An in-line knife 46 is mounted to the lower end of the shank 44. The knife 46 tills the soil and applies fertilizer, as described in further detail below. The knife assembly 16 also includes an up/downforce system with an actuator 48 to maintain proper penetration of the knife 46 in hard or soft soil. Preferably, the knife operates at a depth of approximately 3-6 inches, so as to minimize the horsepower needed for a tractor to pull the row unit 10 through the field.

Figure 2A:
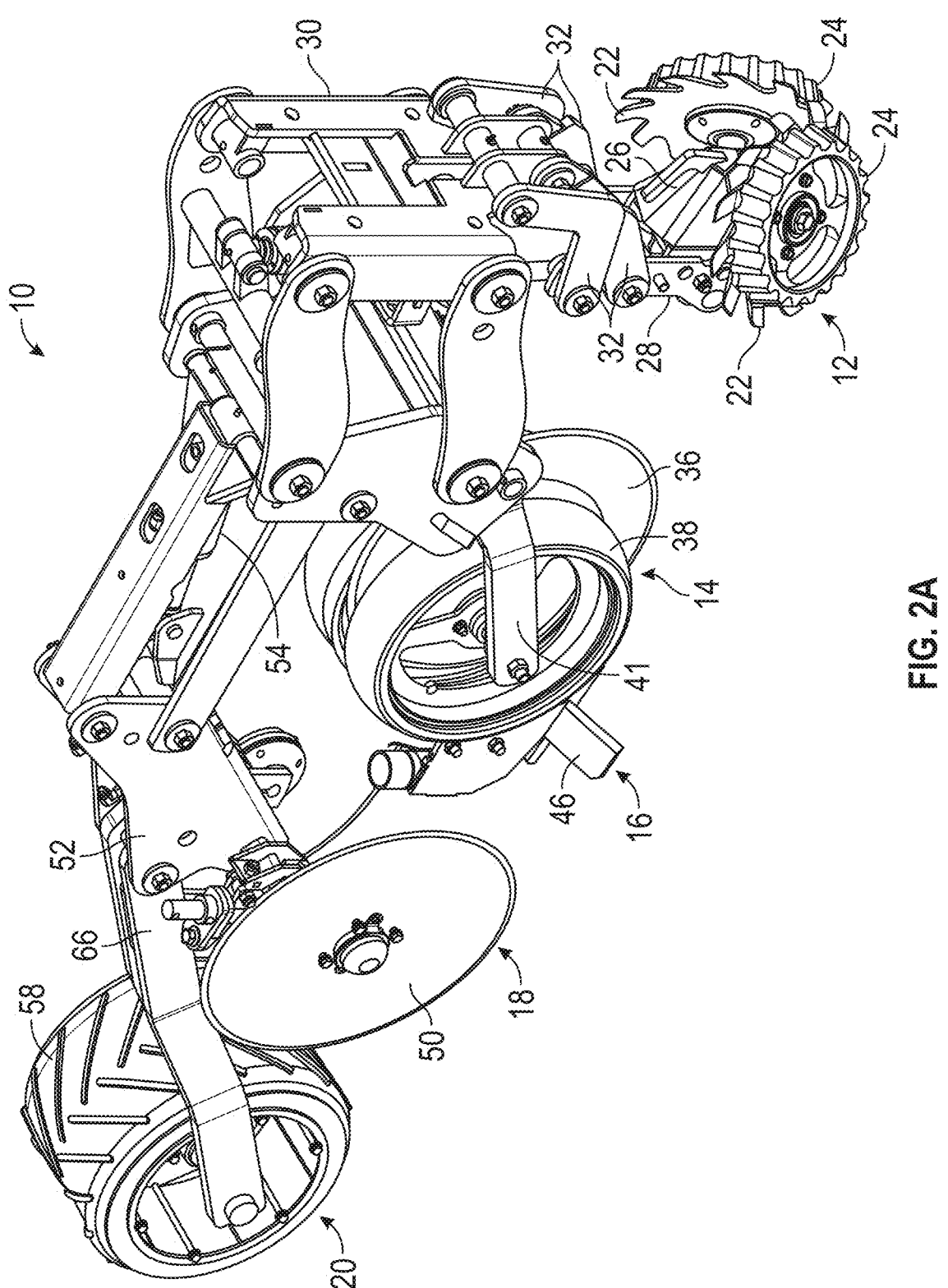
FIG. 2A is a right front perspective view of the striptill row unit, according to the present invention.
Figure 2B:
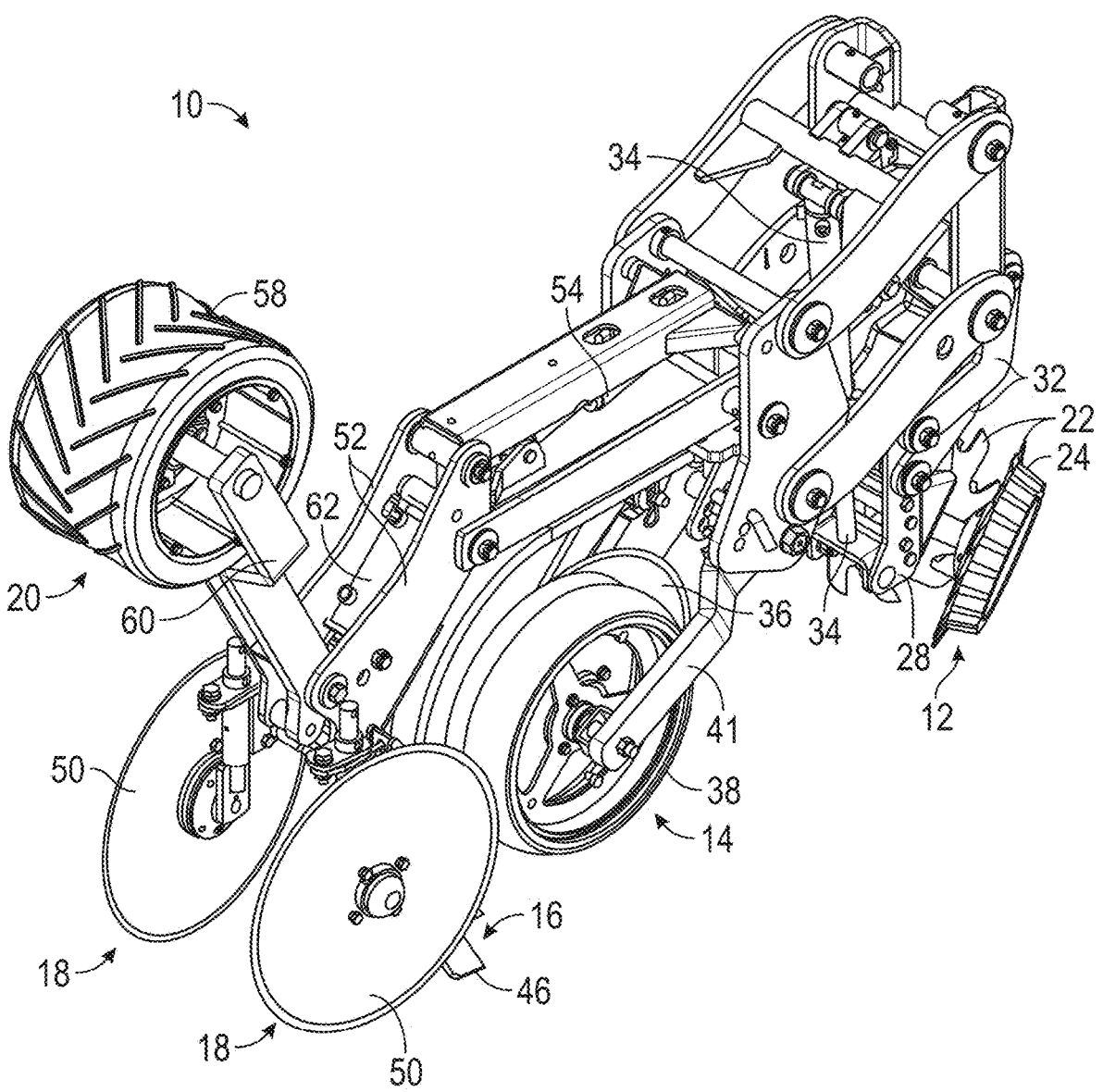
FIG. 2B is a view similar to FIG. 2A, but with the firming wheel raised to a transport position.
Figure 2C:
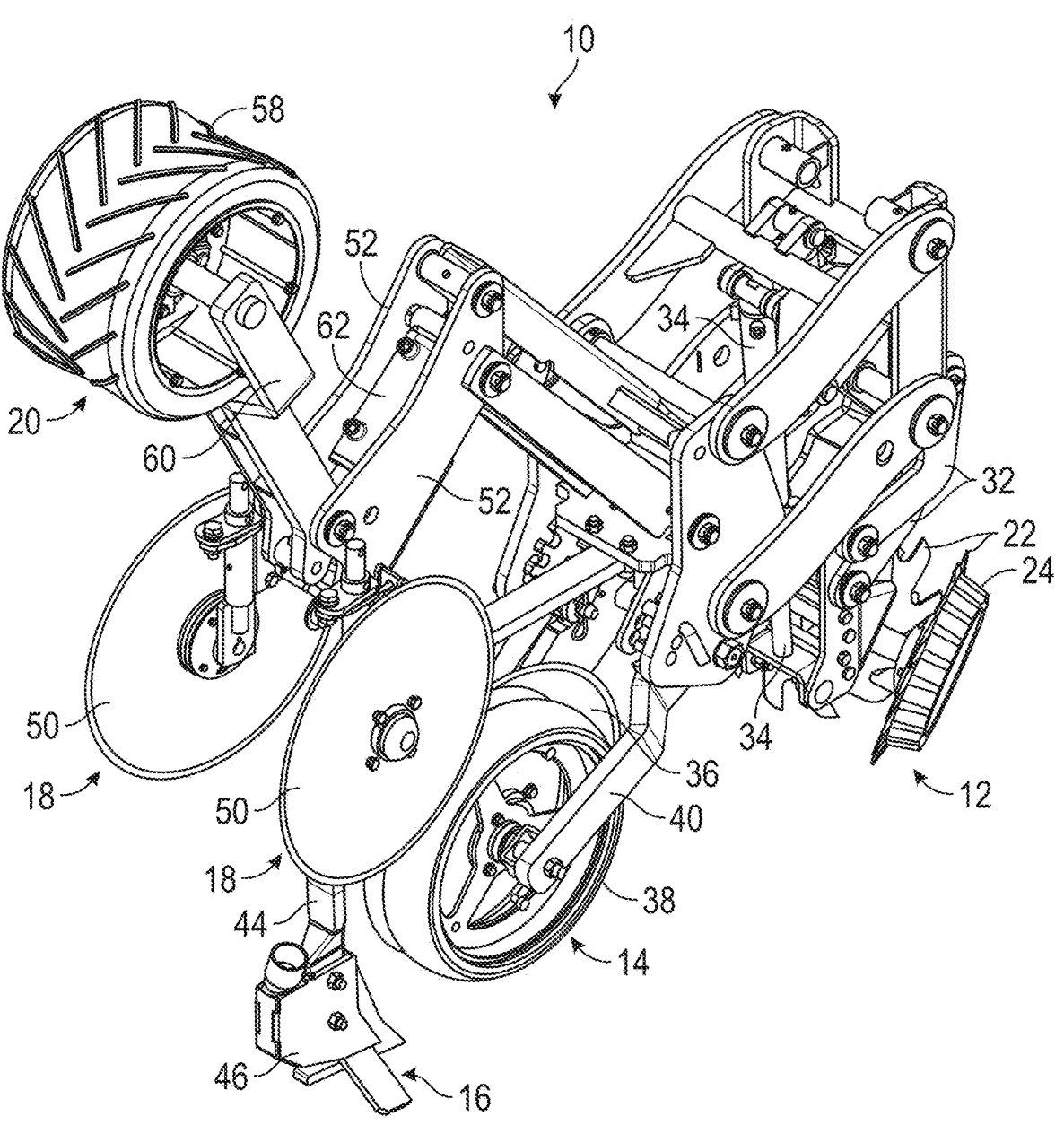
FIG. 2C is a view similar to FIG. 2B, but with the berm discs raised to a transport position.
Figure 3A:
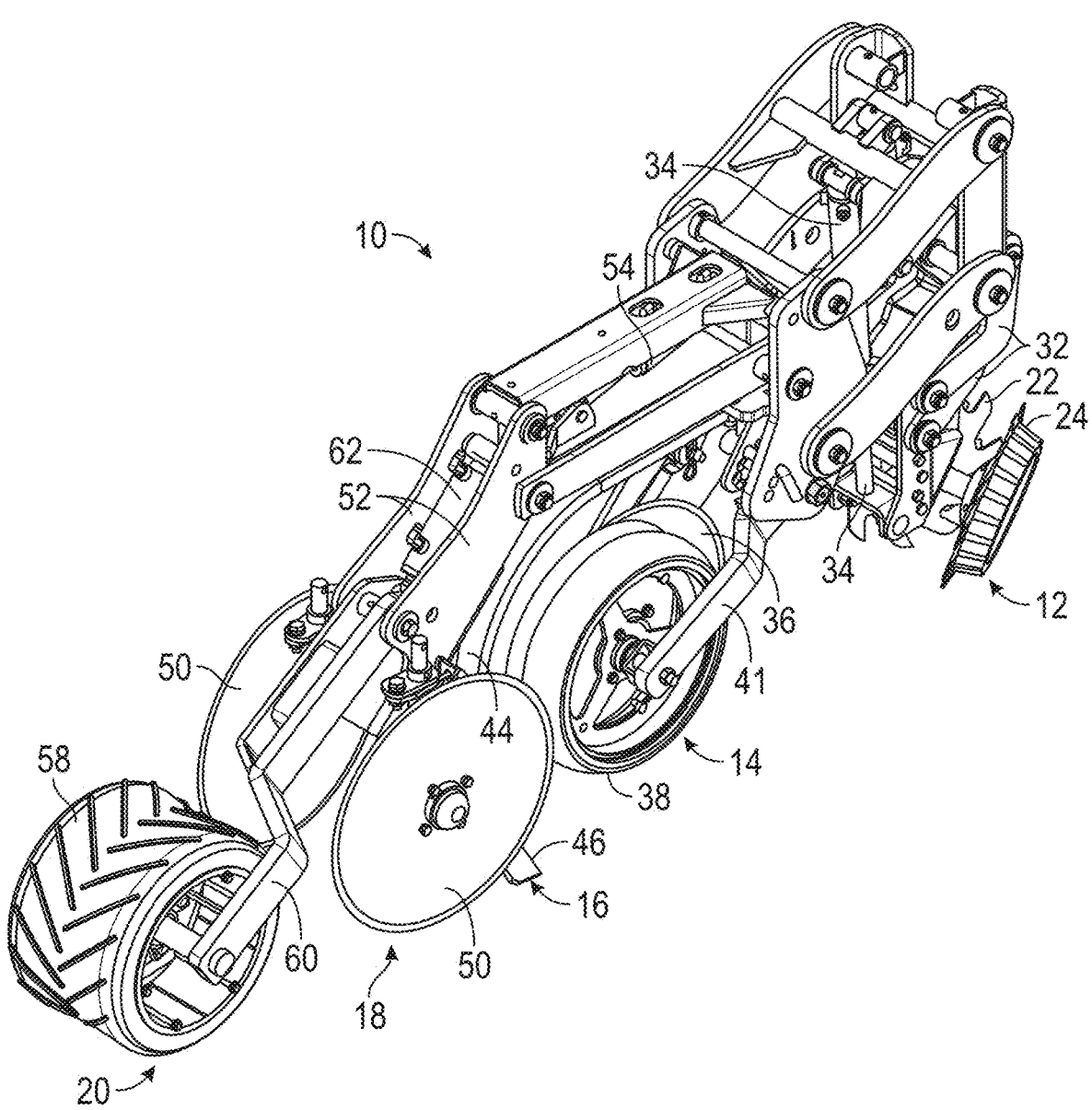
FIG. 3A is a rear perspective view of the striptill row unit, according to the present invention.
Figure 3B:
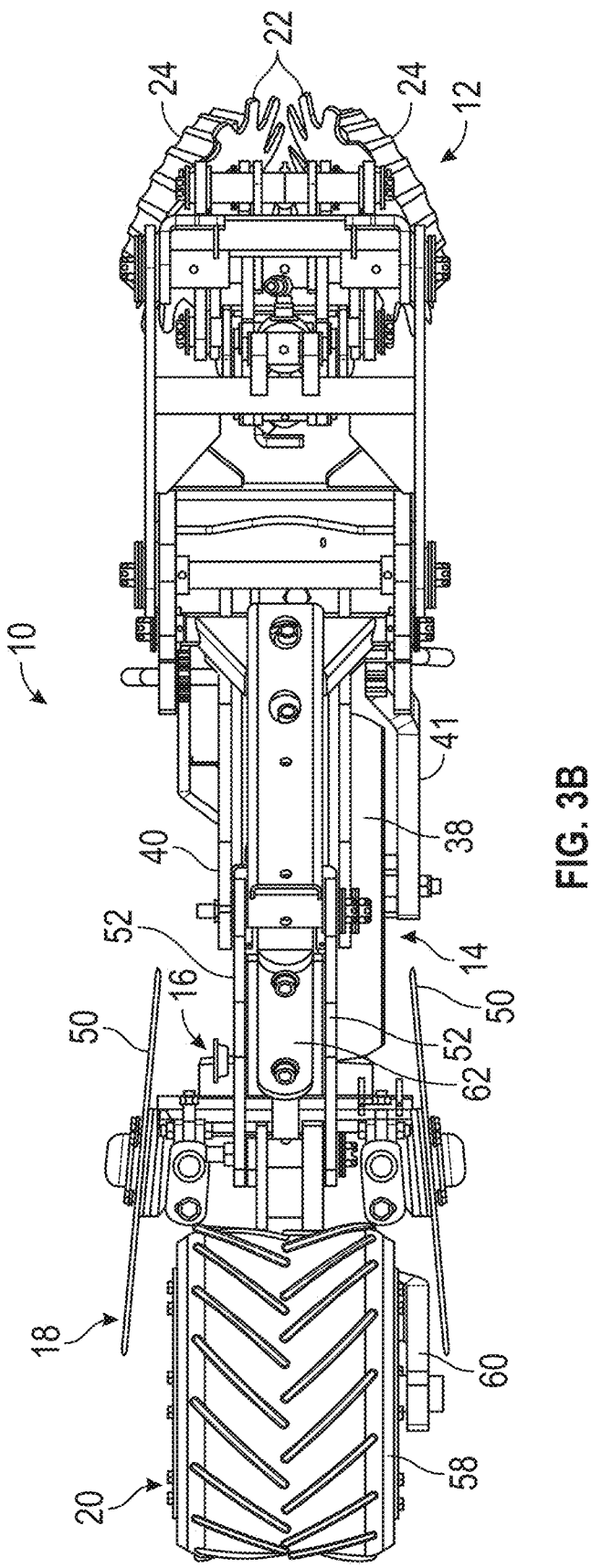
FIG. 3B is a view similar to FIG. 3A, with the firming wheel raised to a transport position.
Figure 3C:
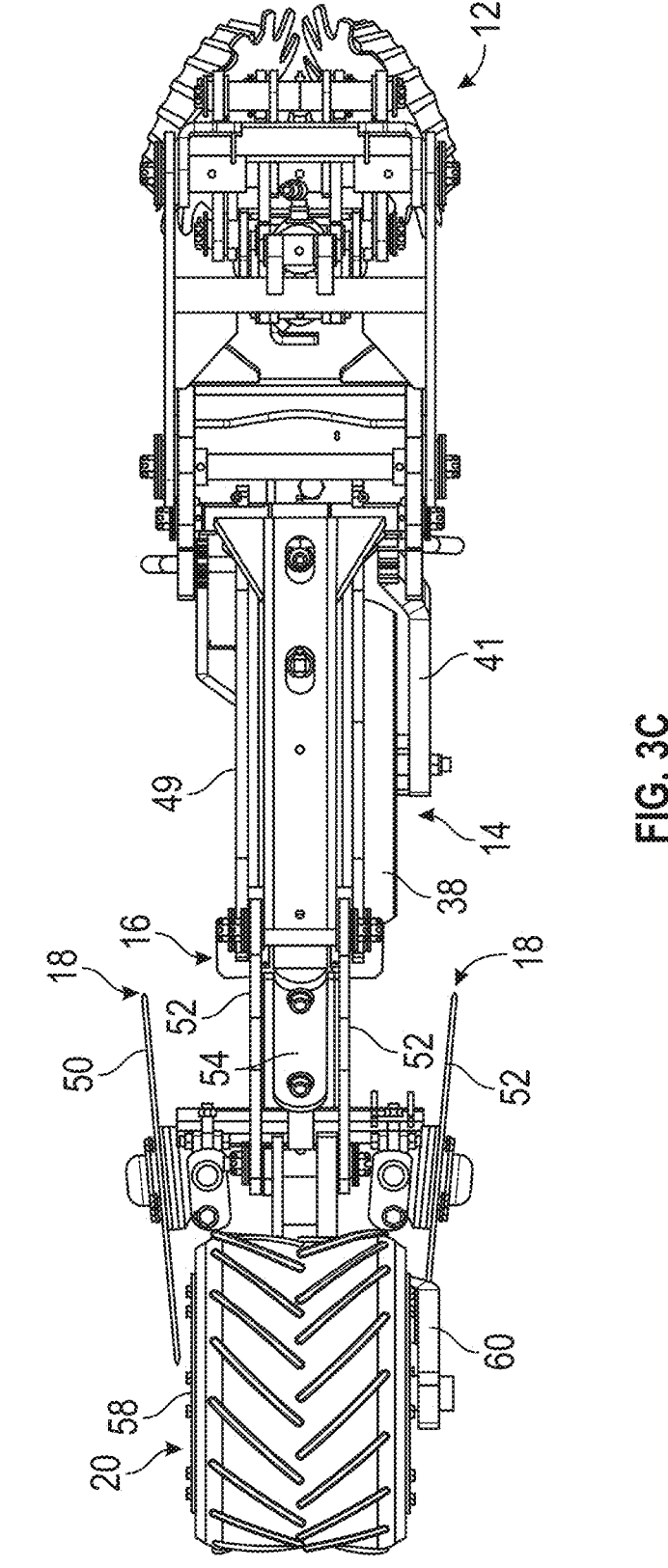
FIG. 3C is a view similar to FIG. 3B, with the berm discs raised to the transport position.
Figure 4:
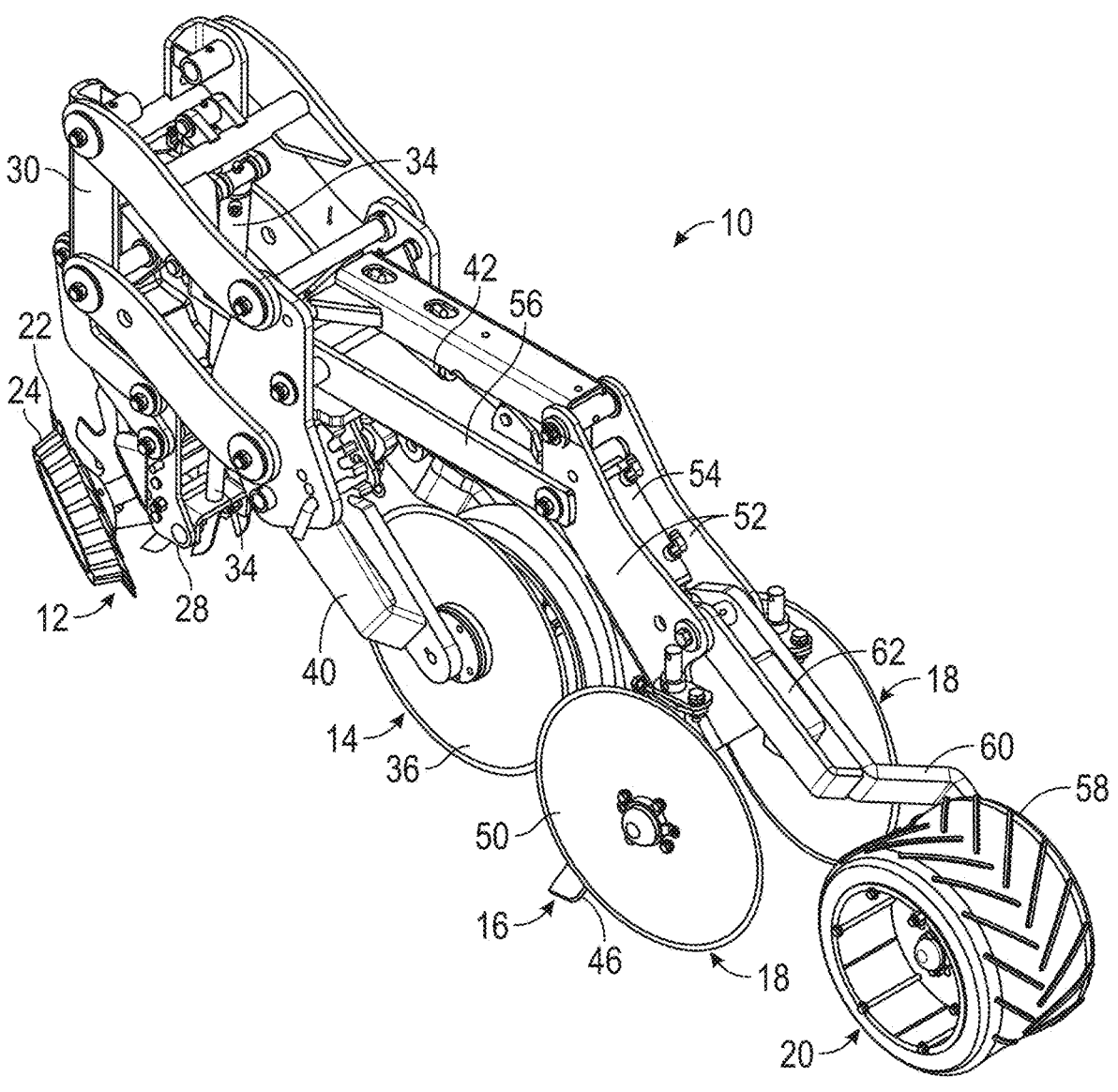
FIG. 4 is a left rear perspective view of the striptill row unit, according to the present invention, with the firming wheel and berm discs in a lowered, field position.
Figure 5A:
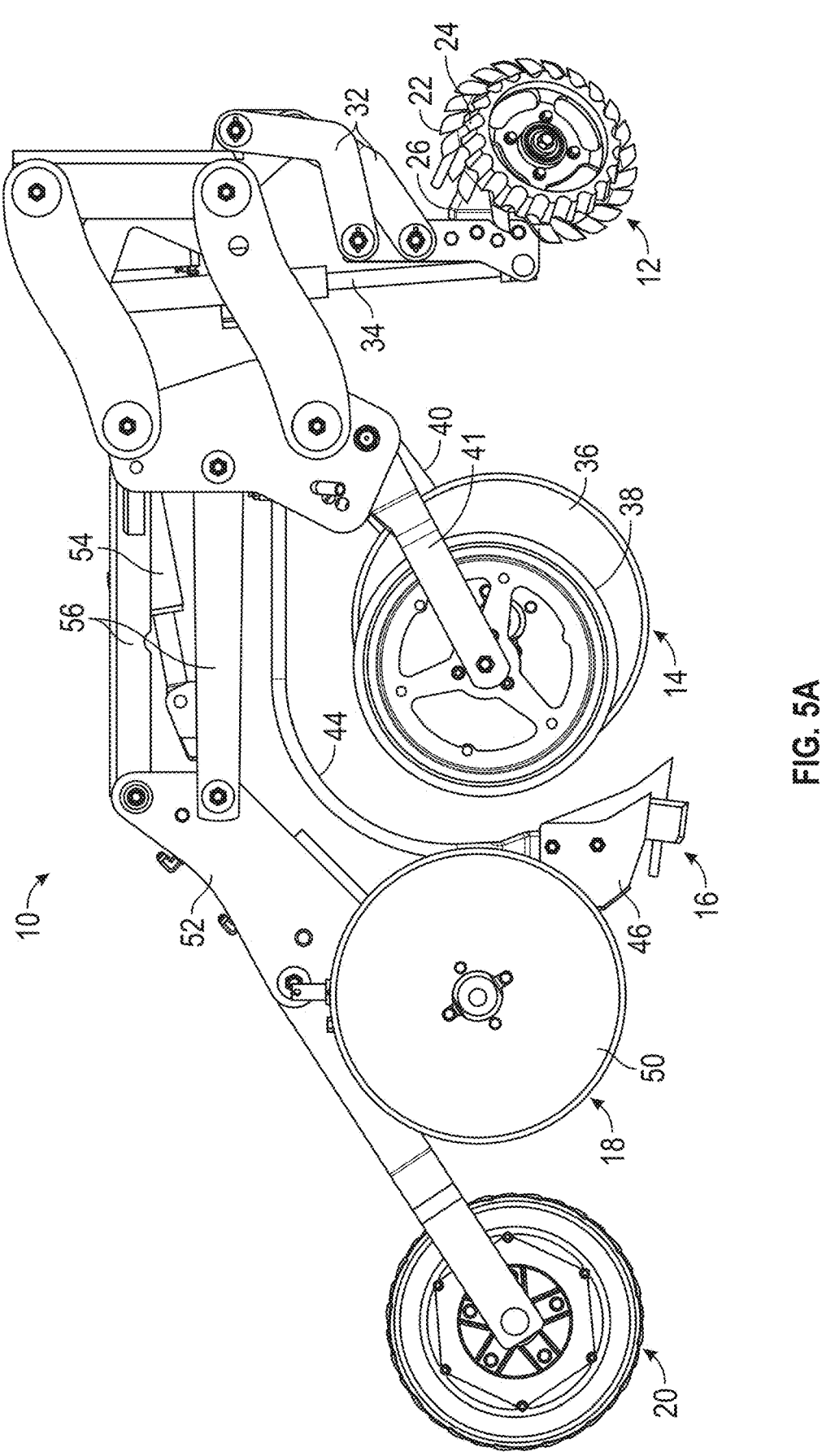
FIG. 5A is a right side elevation view of the striptill row unit, with the components in a lowered, field position.
Figure 5B:
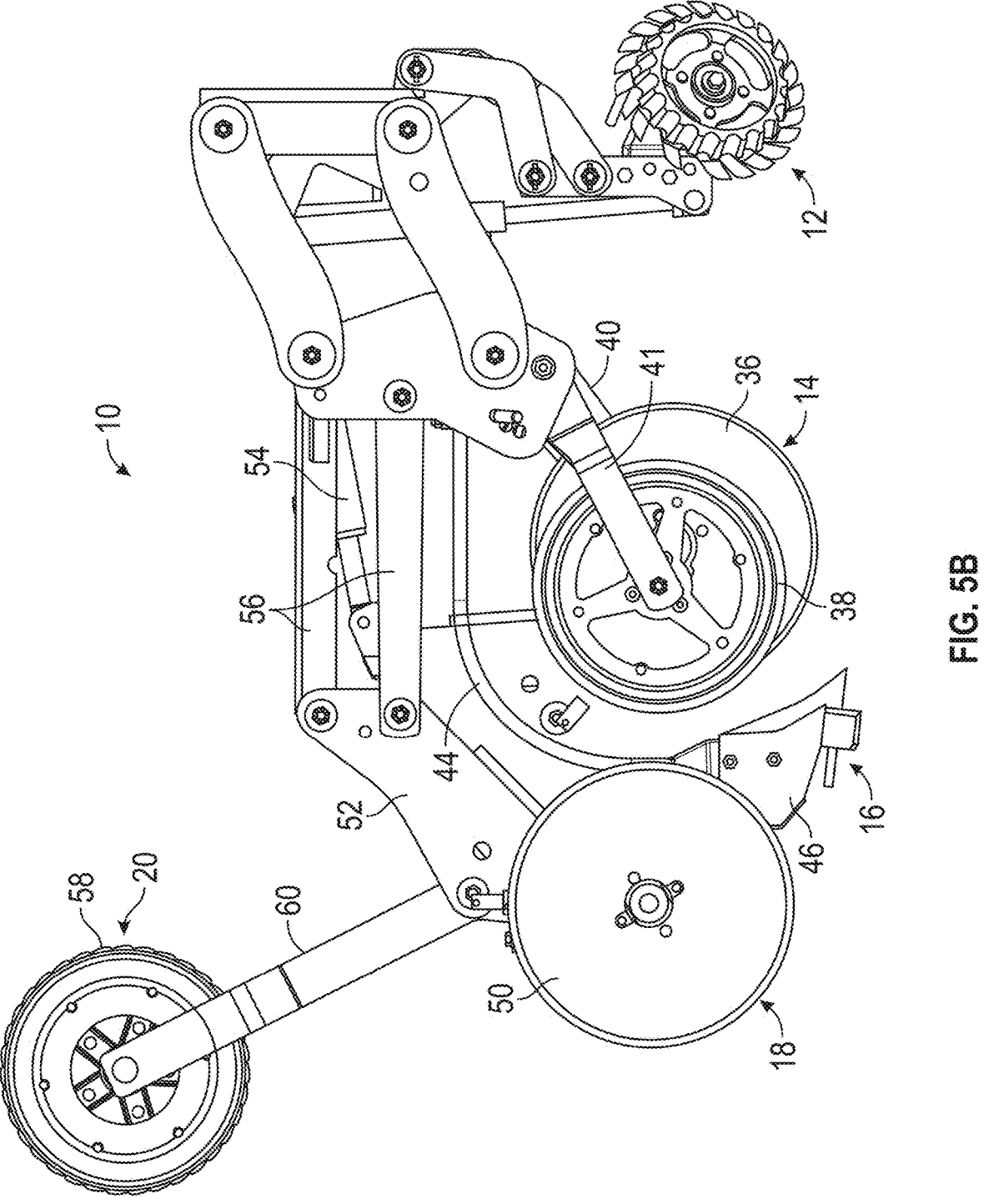
FIG. 5B has a side elevation view of the striptill unit with the berm wheel raised to the transport position.
Figure 5C:
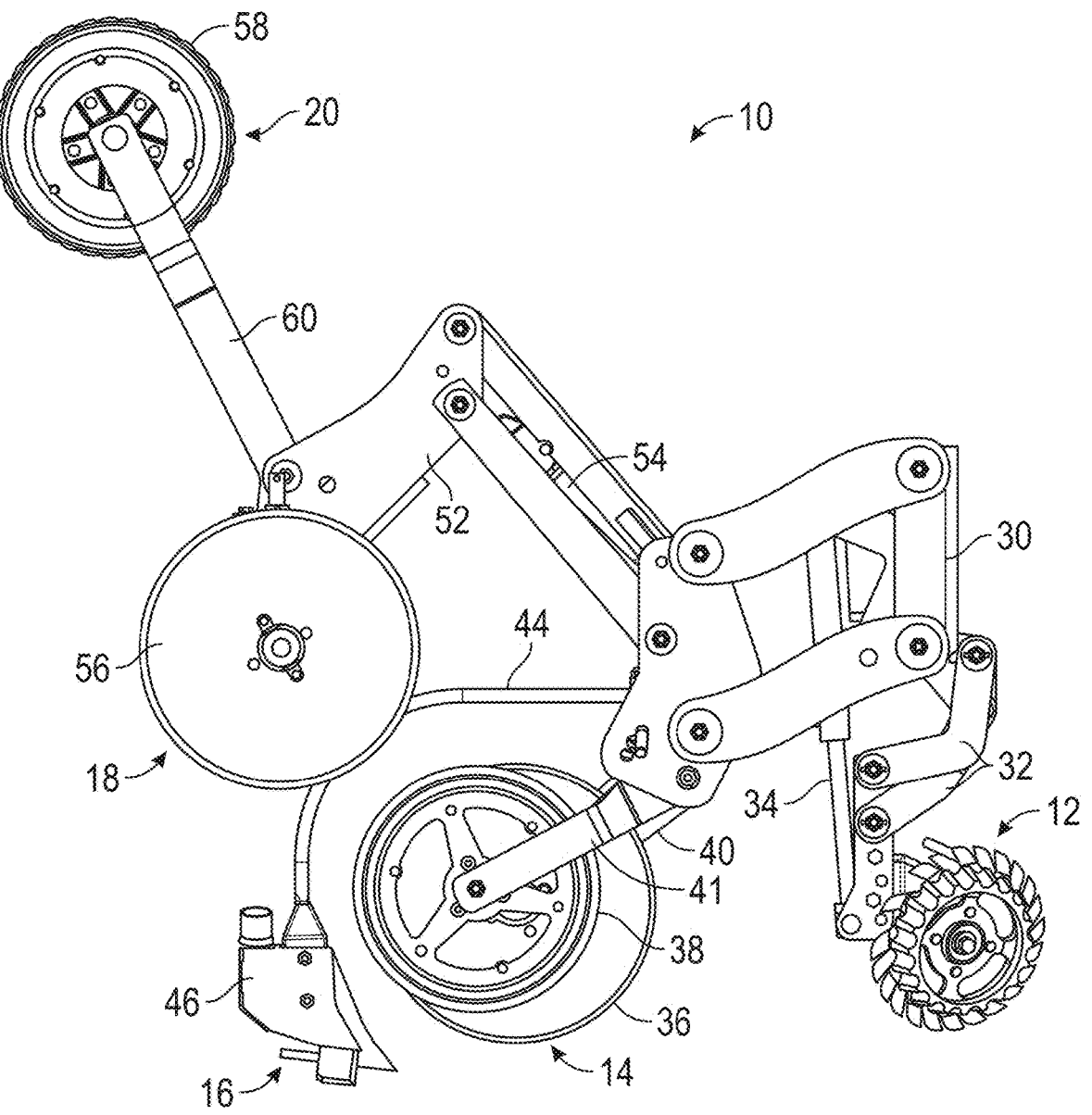
FIG. 5C is a side elevation view of the striptill row unit, with the firming wheel and the berm discs raised to a transport position.
Figures 6A, 6B:
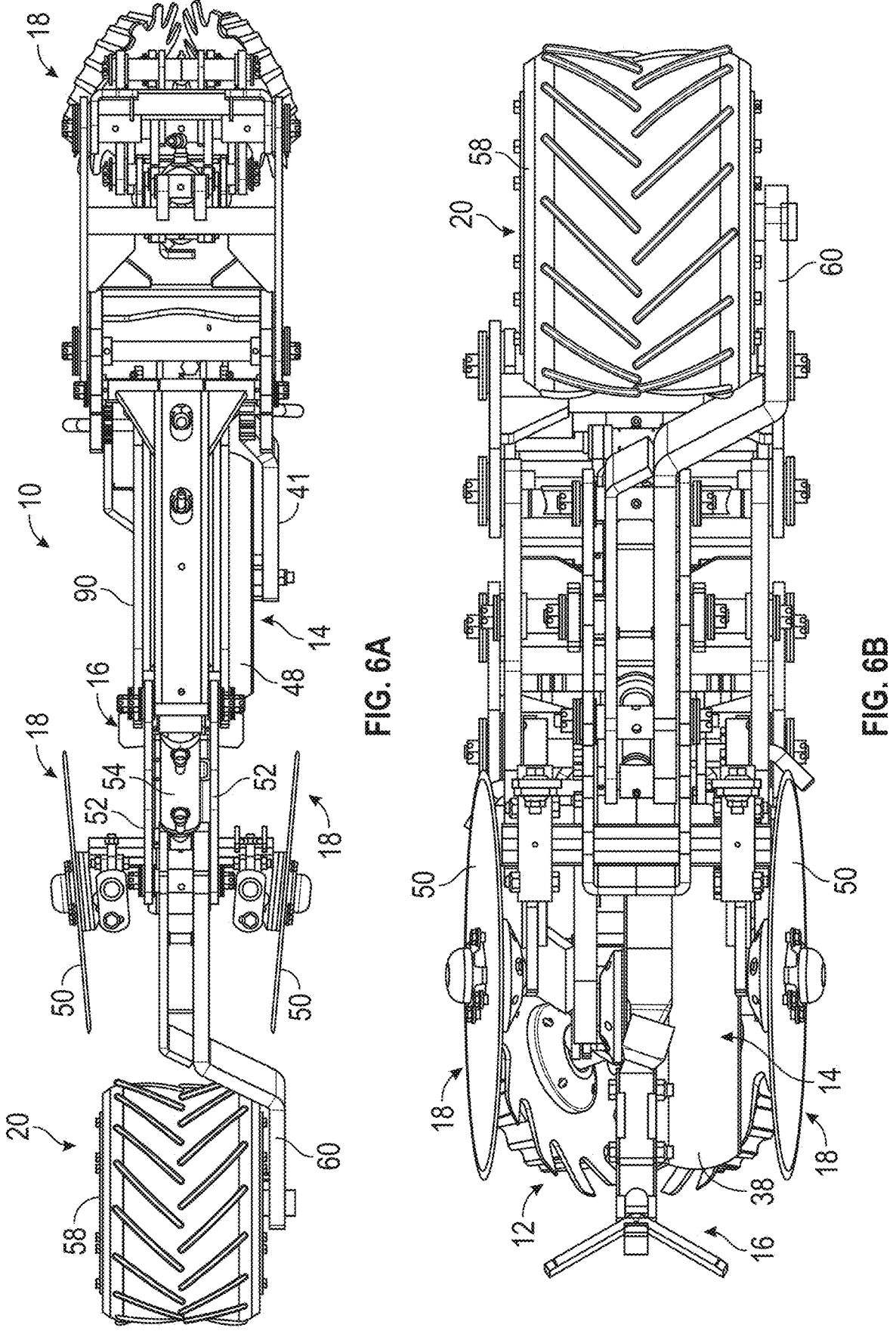
FIG. 6A is a top plan view of the striptill row unit, with the components in the lowered field position.
FIG. 6B is a rear elevation view of the striptill row unit with the firming wheel in a raised position.
Figure 6C:
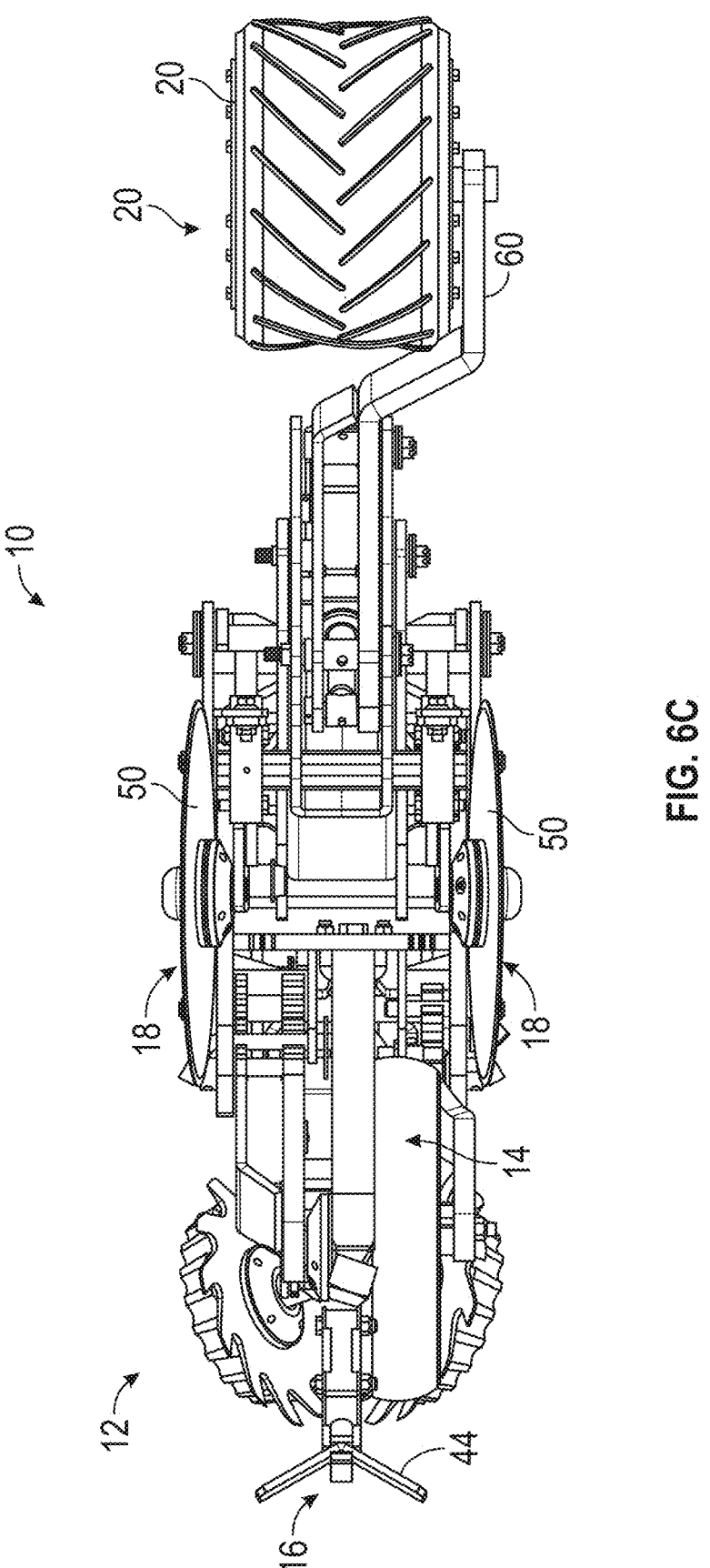
FIG. 6C is a top plan view of the striptill row unit with the firming wheel and berm discs in the raised transport position.
Figure 7:
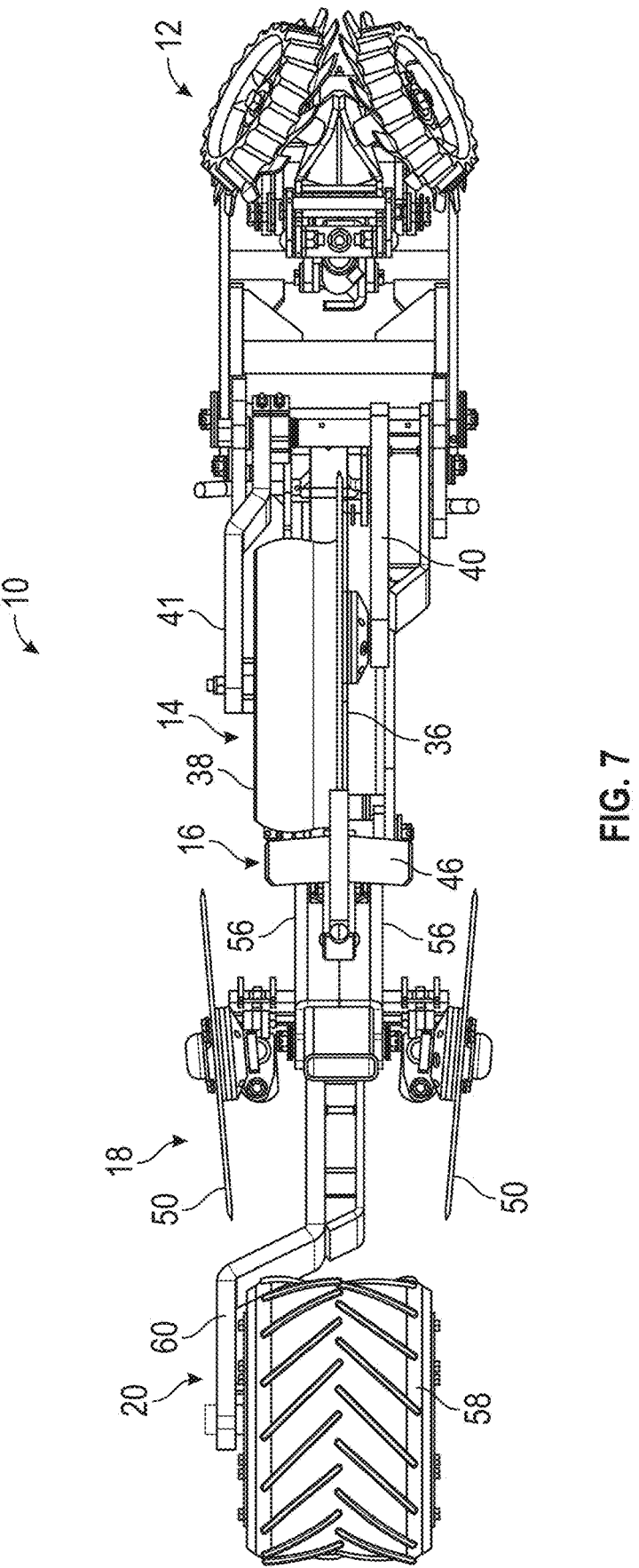
FIG. 7 is a bottom plan view of the striptill row unit, with the components in a lowered field or use position.
Figure 8:
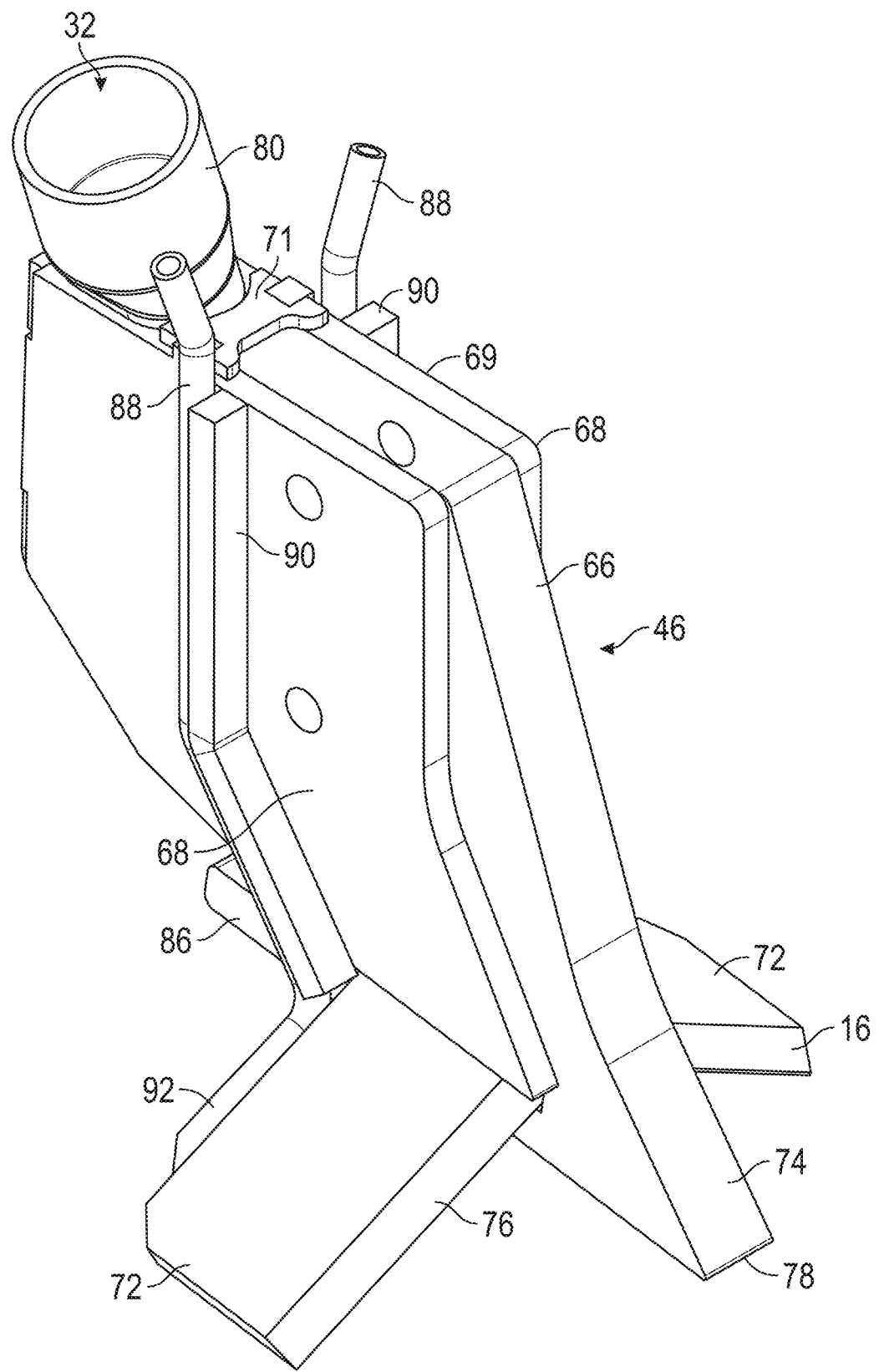
FIG. 8 is a perspective or isometric view of the in-line knife of the striptill row unit.

The berm disc assembly 18 includes a pair of smooth, angularly disposed discs 50. The discs 50 are angularly and adjustably mounted on the row unit 10. The berm discs function to push soil toward the longitudinal centerline of the row unit so as to cover fertilizer applied by the knife assembly 14. The berm discs 50 also function to build a berm to receive seed planted in a subsequent operation. The discs 50 are mounted on an arm 52 which has an actuator 54 to control up/down pressure on the discs 50. The discs are supported on a parallel linkage assembly 56 which maintains the disc angle, thereby ensuring uniform berm building and coverage of fertilizer. The actuator 54 also folds the berm disc assembly 18 between a raised or retracted transport position and a lowered or extended field position, as shown in FIGS. 2C, 3C, and 5C.

The firming wheel assembly 20 includes a wheel 58 mounted on an axle supported by an arm 60. An actuator 62 provides up/downforce to the wheel 58 so as to apply the desired pressure on the berm so as to firm the berm and thereby minimize moisture loss and wind erosion of the soil. The actuator 62 also moves the berm disc for the firming wheel assembly 20 between a raised transport position and a lowered field position. When the berm disc assembly and firming wheel assembly 20 are raised and folded inwardly to the transport position, the overall width of the row unit 10 is minimized for safety during transport of the row unit along roadways.

Figure 12:
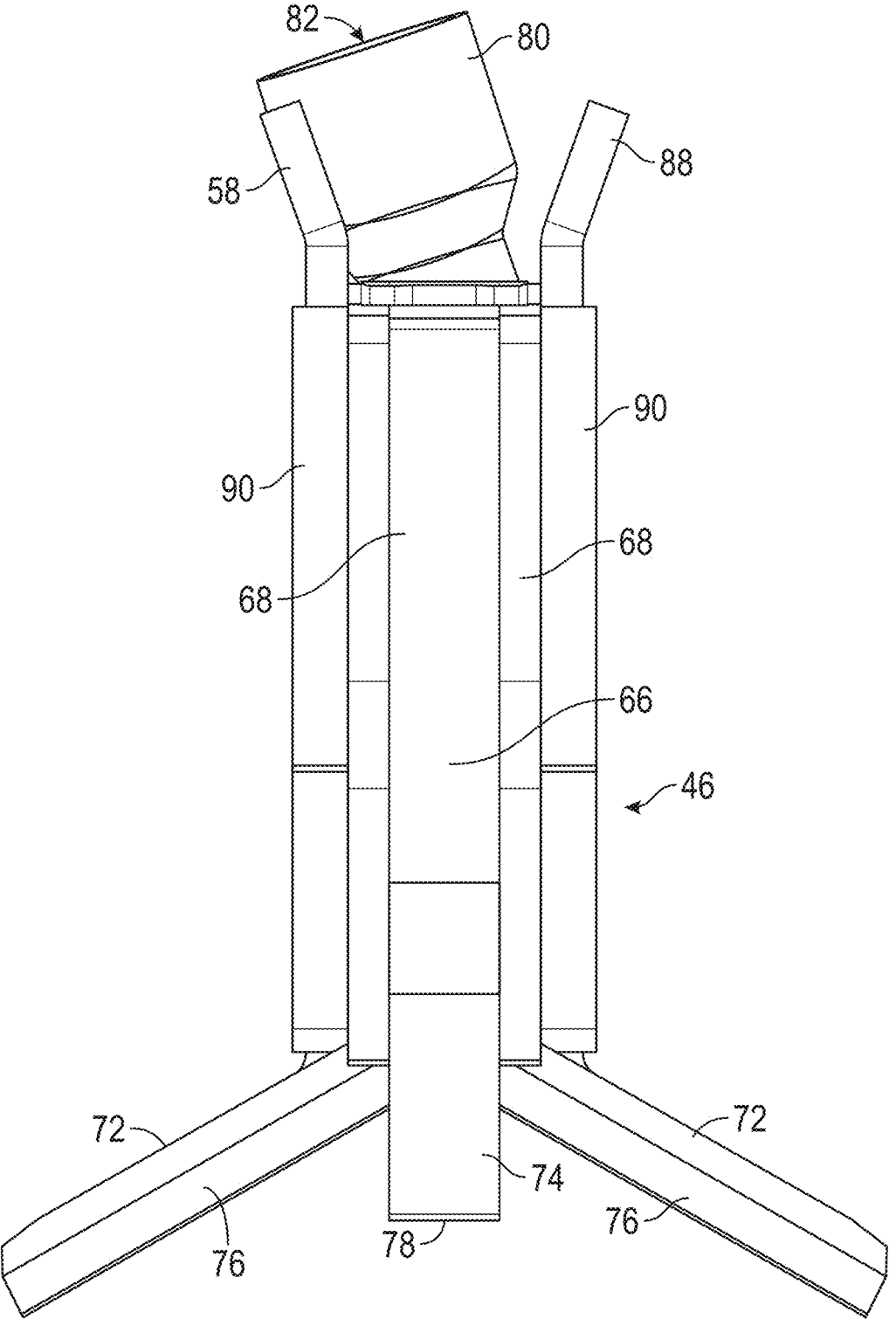
FIG. 12 is a front elevation view of the knife.

The knife assembly 16, best seen in FIGS. 8-14 includes an upright body 64, a shank 66, side plates 68, a rear plate 70, and a top plate 71, and a pair of wings 72 extending laterally outwardly near the bottom of the body 78. The leading edge 74 of the body 64 is sloped rearwardly from the bottom to the top. The wings 72 each have a leading edge 76 which extends substantially perpendicular to the line of travel of the row unit 10. The wings 72 are angled downwardly from the body 64, as seen in FIG. 12.

The leading edge 76 of the wings 72 force the soil upwardly during the tillage operations, rather than forcing the soil laterally outward as in prior art wings which have rearwardly sweeping leading edges that cause soil compaction. Thus, the wings 72 create a cavity, due to the upward movement of soil, for receipt of fertilizer. The front lower point 78 of the body, the upward and rearward slope of the leading edge 74, also creates a natural lifting action to the soil, in addition to facilitating soil penetration by the knife.

The downwardly angled wings 72 create a cavity or zone in the soil on each side of the body 64 which fertilizer is deposited near the natural root zone of the crop which will be planted. The knife assembly 16 also includes an enlarged diameter tube 80 to receive dry or granular fertilizer. The body has an upper inlet 82 and a lower outlet 84. A single or pair of diverter fingers 86 provided on the bottom rear side of the body 64 below the fertilizer outlet 84. The fingers 86 function to direct the fertilizer laterally outwardly into the cavities formed by the wings 72, so as to eliminate any hot fertilizer zone with increased fertilizer concentration, which can be damaging to the crops.

Figure 9:
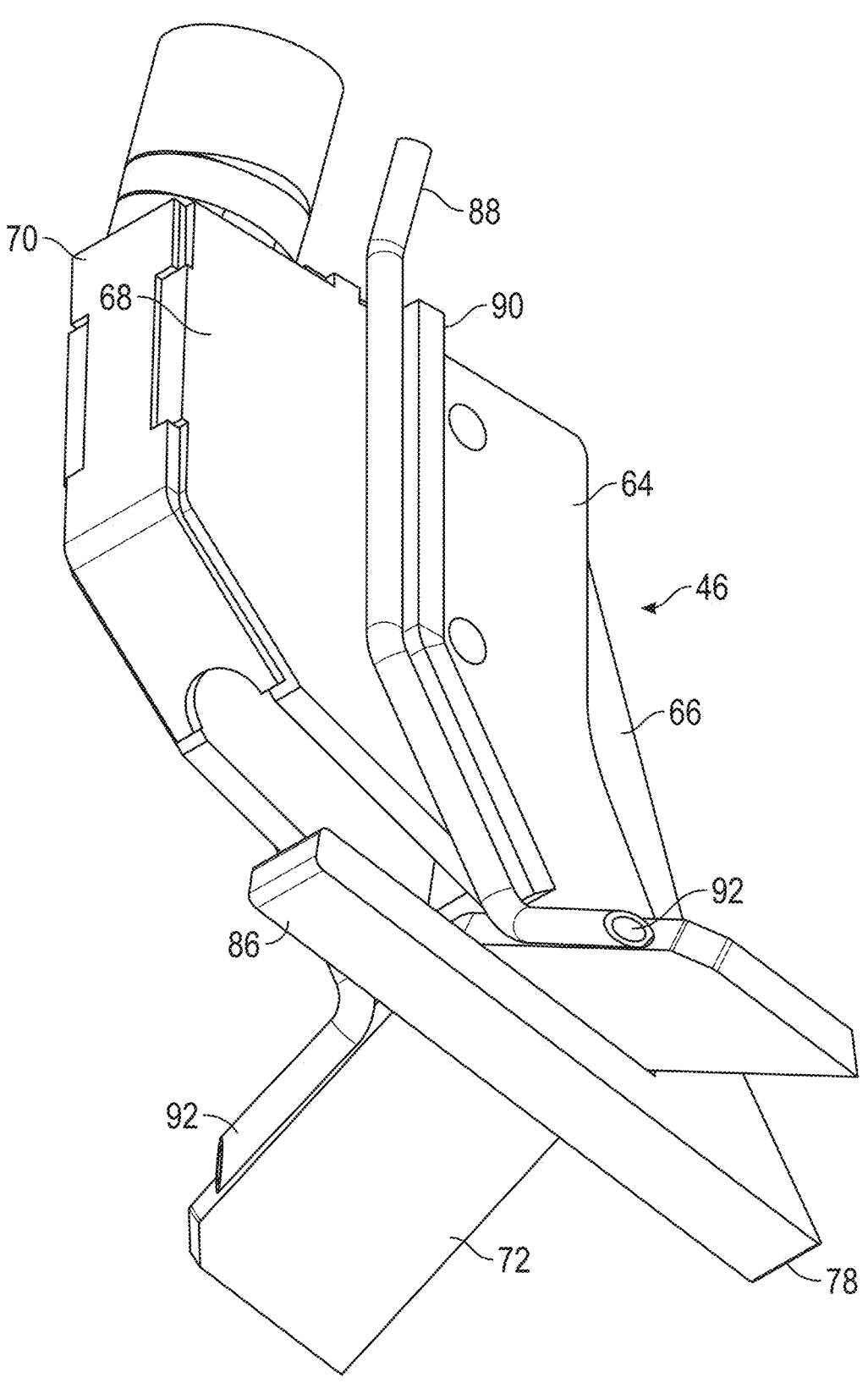
FIG. 9 is a rear lower perspective view of the in-line knife of the striptill row unit.
Figure 10:
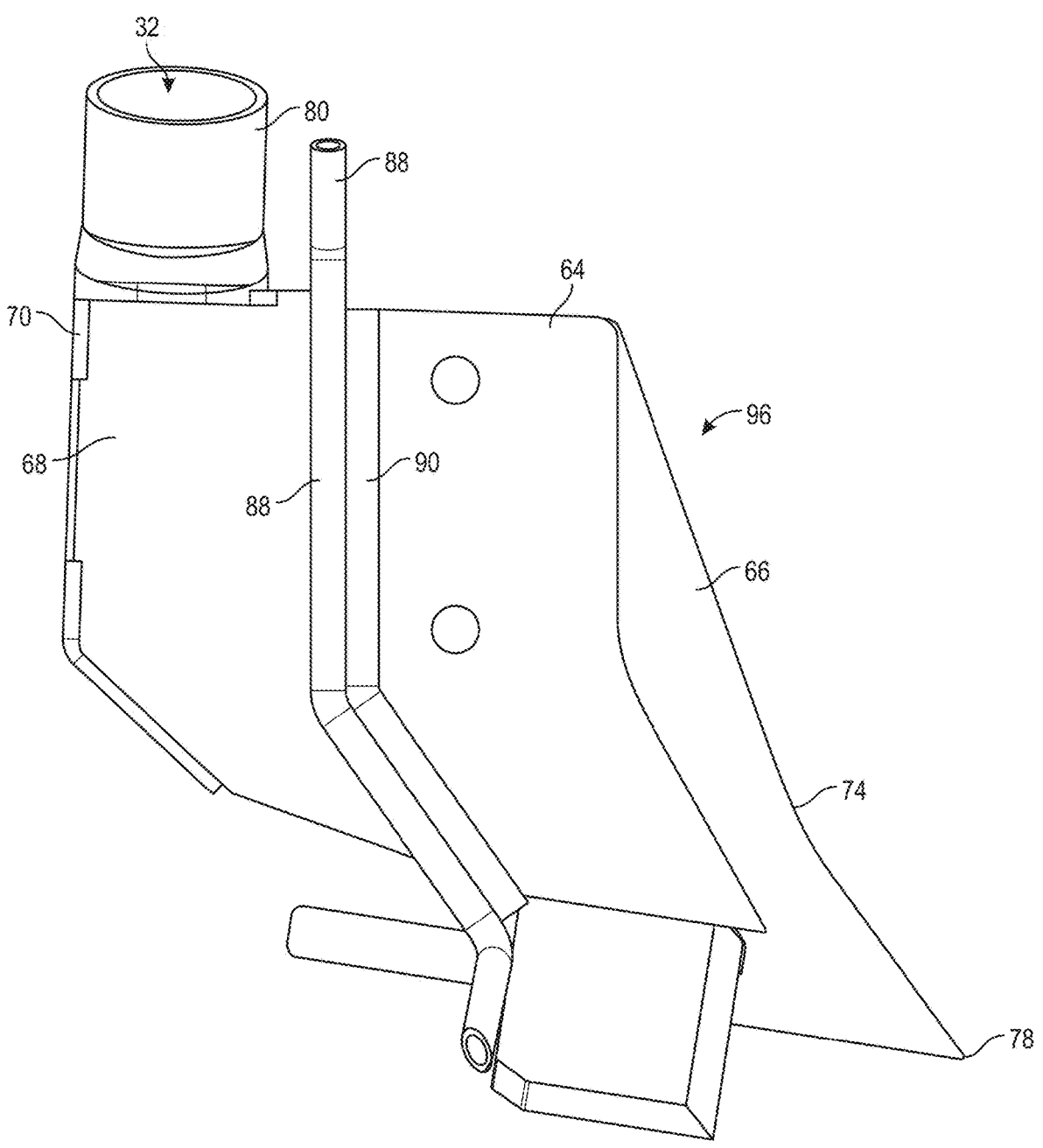
FIG. 10 is a side elevation view of the knife.
Figure 11:
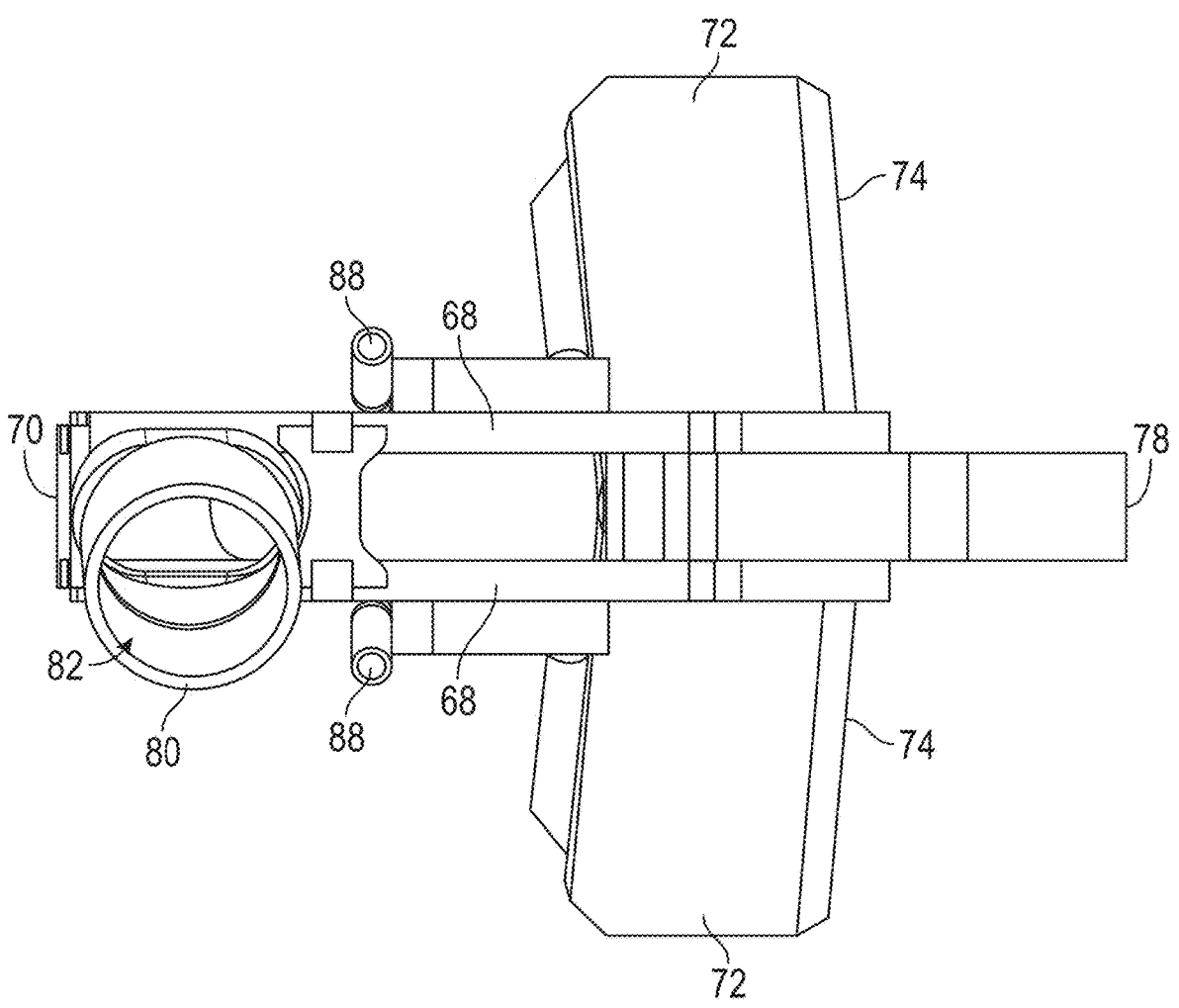
FIG. 11 is a top plan view of the knife.
Figure 13:
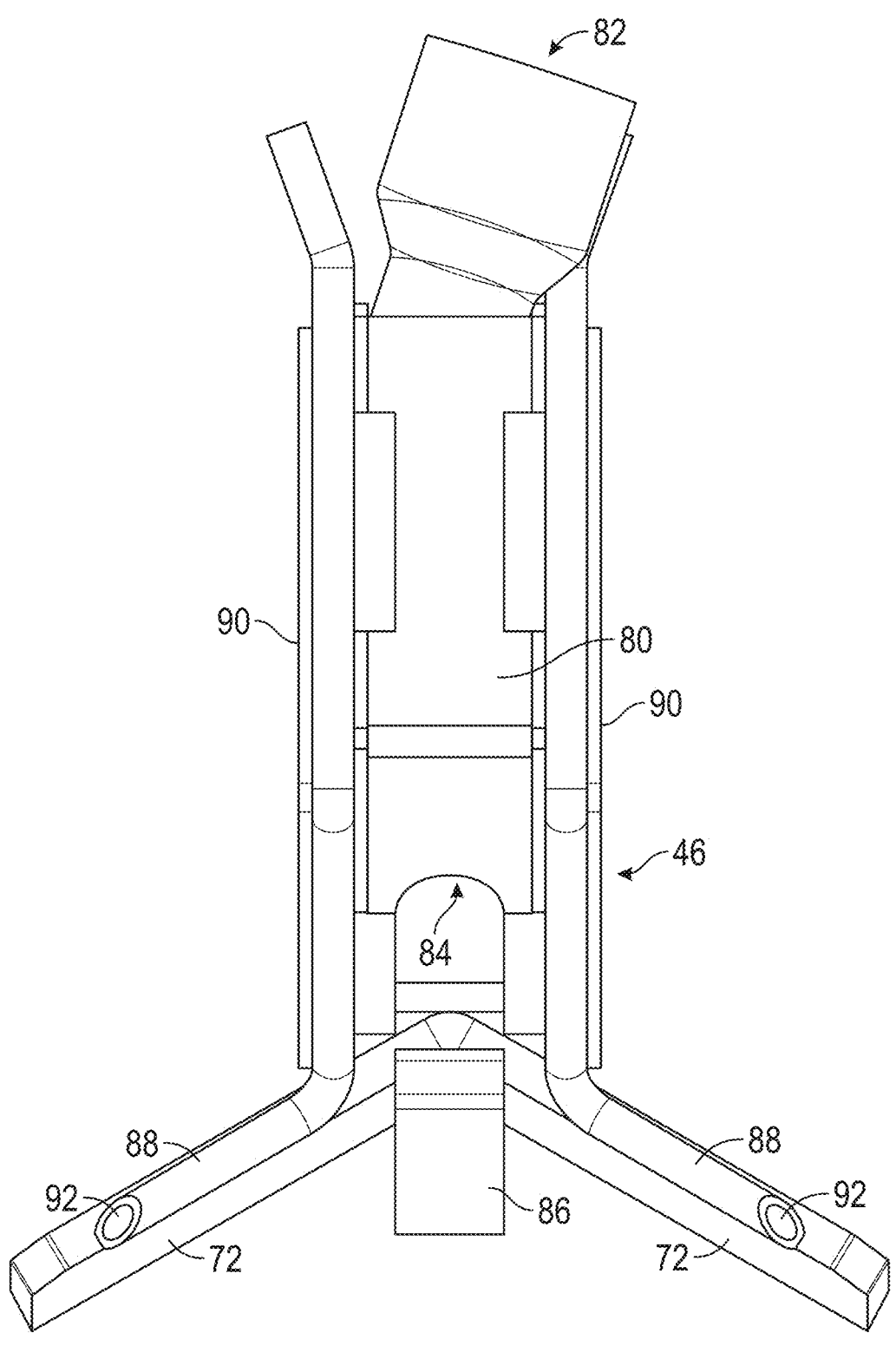
FIG. 13 is a rear elevation view of the knife.
Figure 14:
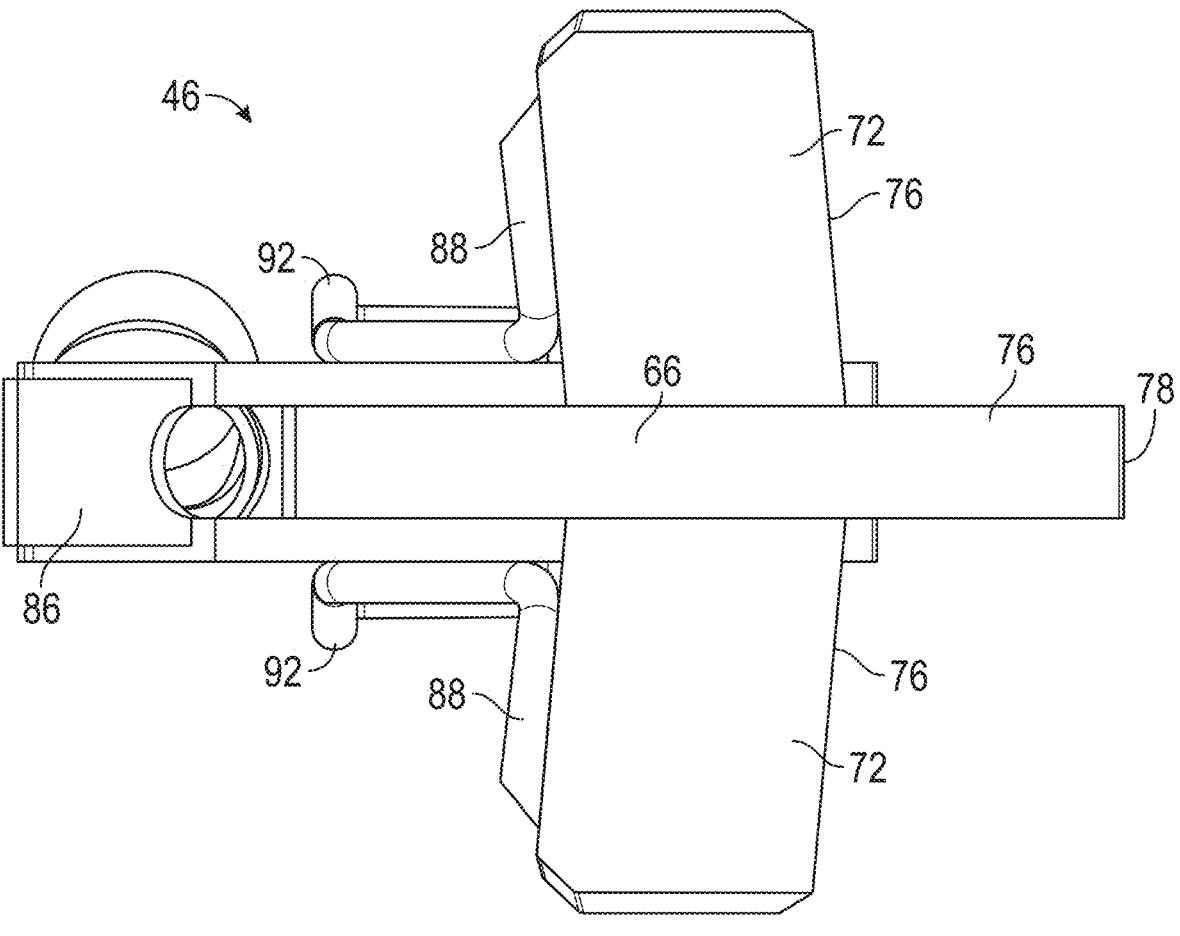
FIG. 14 is a bottom plan view of the knife.

A pair of liquid fertilizer tubes 88 extend downwardly along opposite sides of the body 64. A protective guard or plate 90 is fixed to the side of the body 64 in front of the tubes 88 to protect the tubes as the knife moves through the soil. The tubes 88 have lower ends 92 which extend laterally outwardly behind the wings 72, as best seen in FIGS. 9 and 13.

Anhydrous ammonia can be provided through the knife assembly 16.

The actuators 34, 42, 48, 54, and 62 preferably are hydraulic, but alternatively can be pneumatic, electric, or other systems to control movement of the associated components. The actuators operate independently of one another with independent control of the components.

Figure 15:
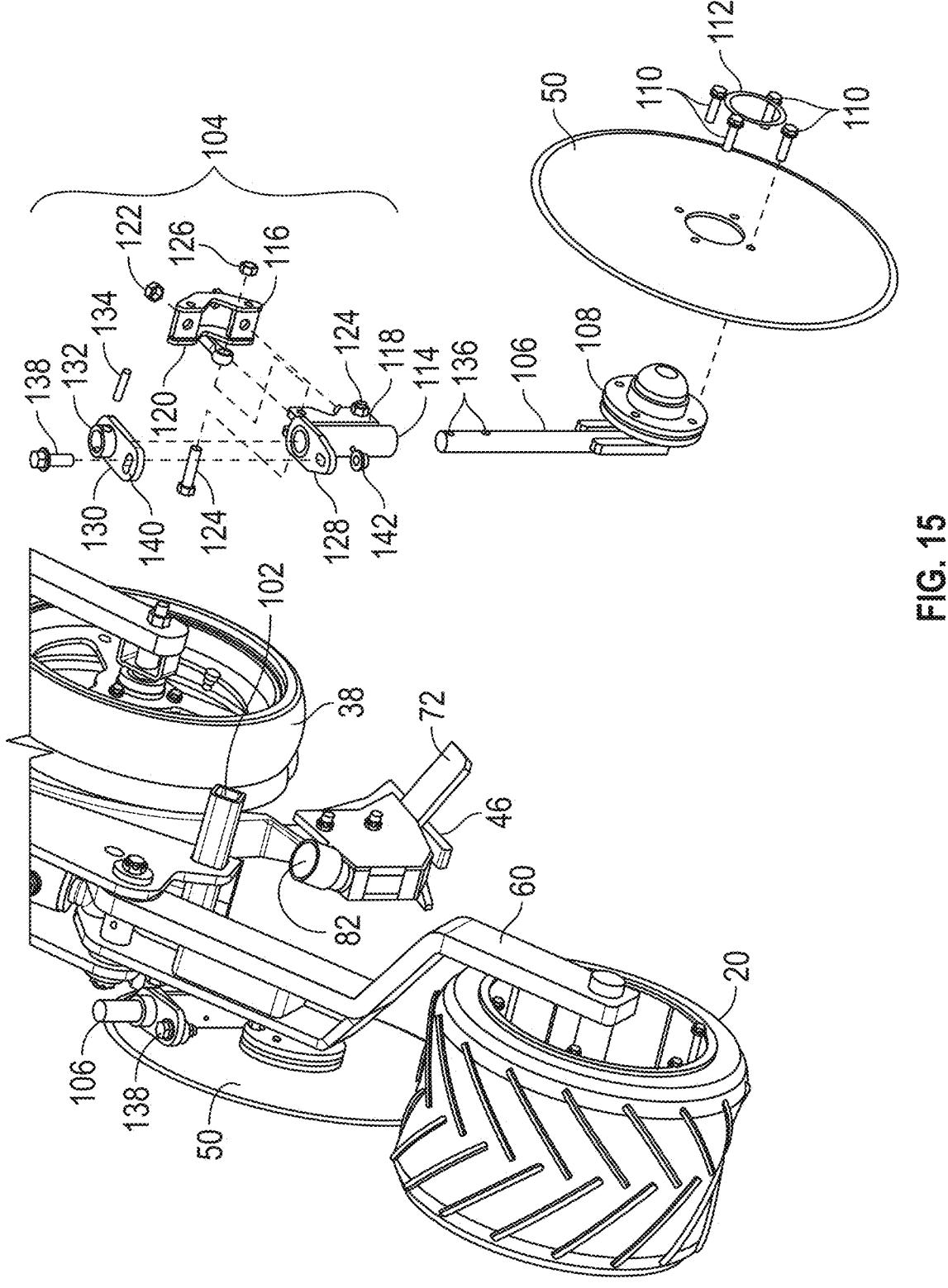
FIG. 15 is an exploded view of the adjustable disc assembly.

FIG. 15 shows an exploded view of the adjustable berm disc 50. The disc 50 is mounted on a square shaft 102 via a bracket assembly 104 which rotatably supports an arm 106. A hub 108 is mounted on the bottom of the arm 106, and a disc 50 is secured to the hub 108 with a plurality of bolts 110. The hub 108 includes bearings (not shown), which are sealed by a dust cap retainer 112.

The bracket assembly 104 includes a tube 114 and a clamp 116, 118. The clamp half 118 of a clamp welded or otherwise secured thereto. The second half 116 of the clamp is detachably connected to the first half 118 by upper and lower bolts 120 and nuts 122, and upper bolts 124 and nuts 126 which extend to the eye of the bolts 120. A plate 128 is fixed on the upper end of the tube 114. A second, upper plate 132 is secured to the lower first plate 128 via a bolt 138 extending through a slot 140 in the upper plate 132 and an aligned hole in the lower plate 128, and secured by a nut 142. The arm 106 extends through the tube 114 and is secured or fixed by a pin or bolt 134 extending through aligned holes in the collar 132 of the upper plate 130 and holes 136 in the arm 106. Thus, the arm 106 can be vertically adjusted by selecting which hole 136 the pin 134 extends through, thus raising or lowering the berm disc 50. The angular orientation of the berm disc 50 can also be adjusted by loosening the bolt 138 and rotating the upper plate 140 via the slot 140 through which the bolt 138 extends. The berm disc assembly is mounted on the shaft 102, which allows the lateral position of the berm disc 50 to be adjusted by loosening and tightening the clamp assembly 116, 118 on the tube 102. Thus, the berm disc 50 can be adjusted laterally, vertically, and angularly.

Figure 16A:
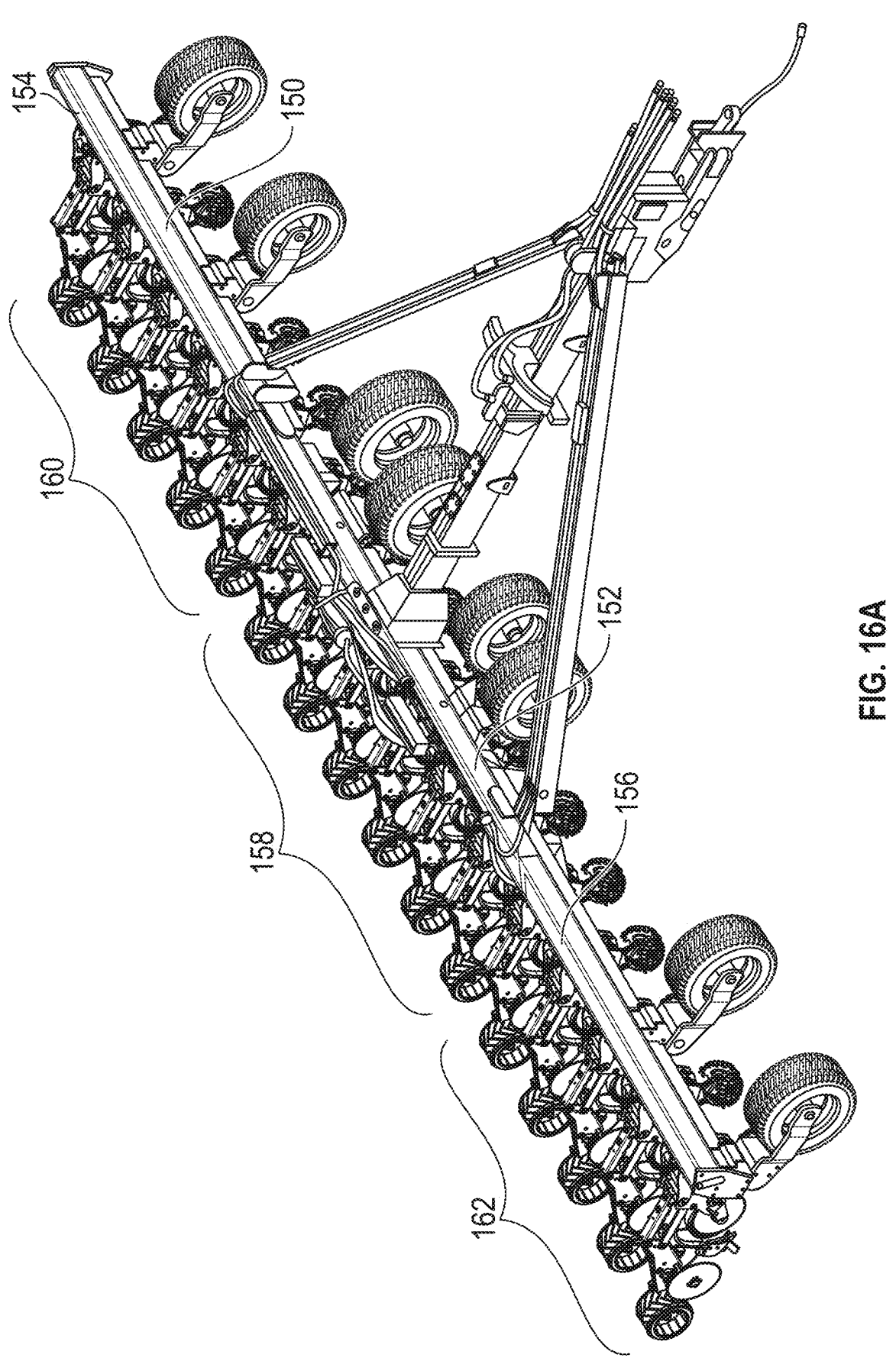
FIGS. 16A and 16B are perspective views of the striptill toolbar assembly of the present invention, in the field or use position.
Figure 16B:
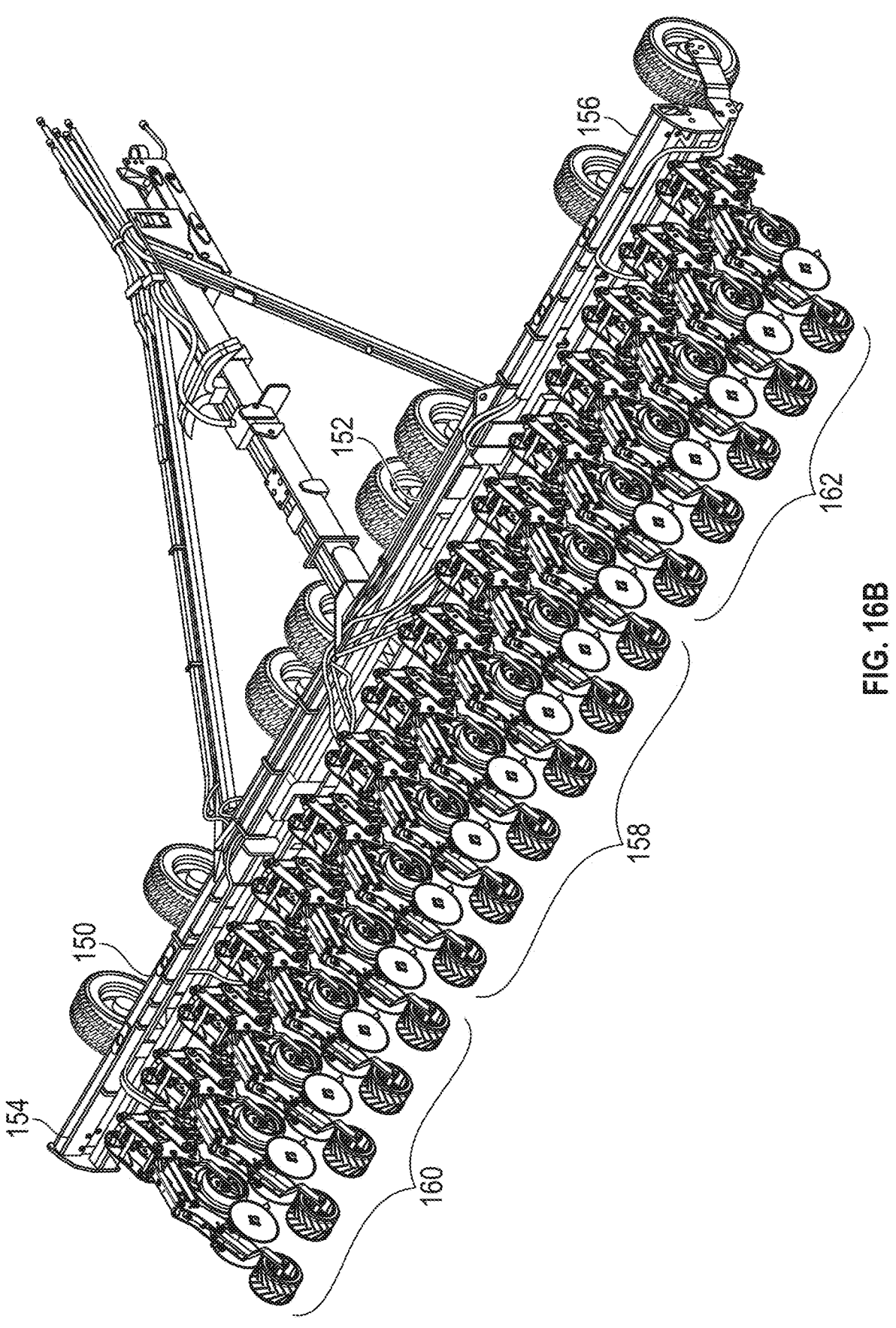
Figure 16C:
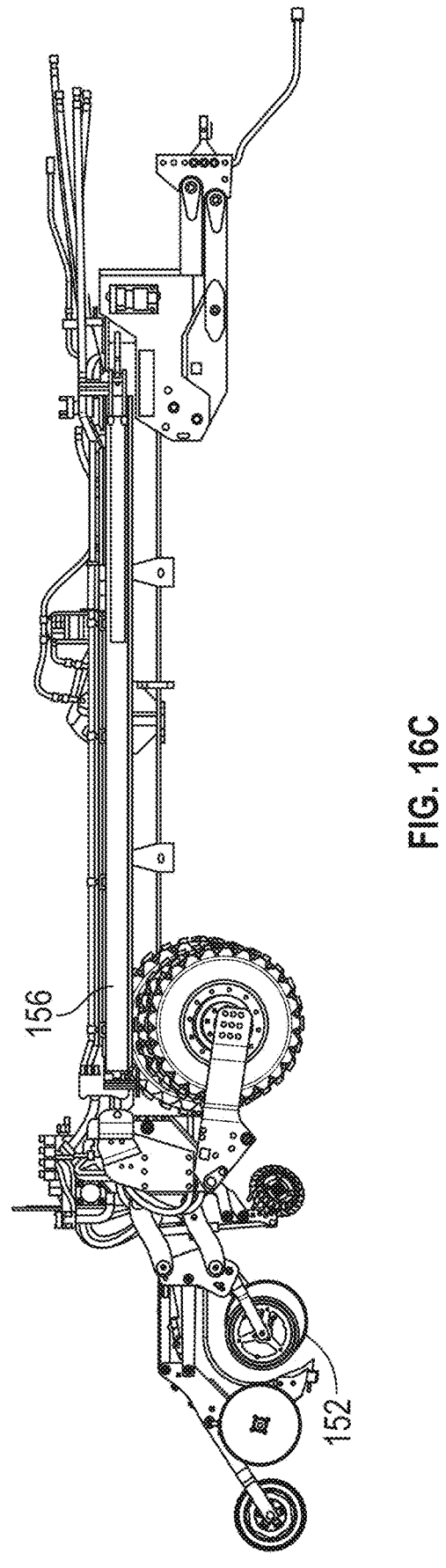
FIG. 16C is a side elevation view of the striptill row unit in the field or use position.
Figure 17A:
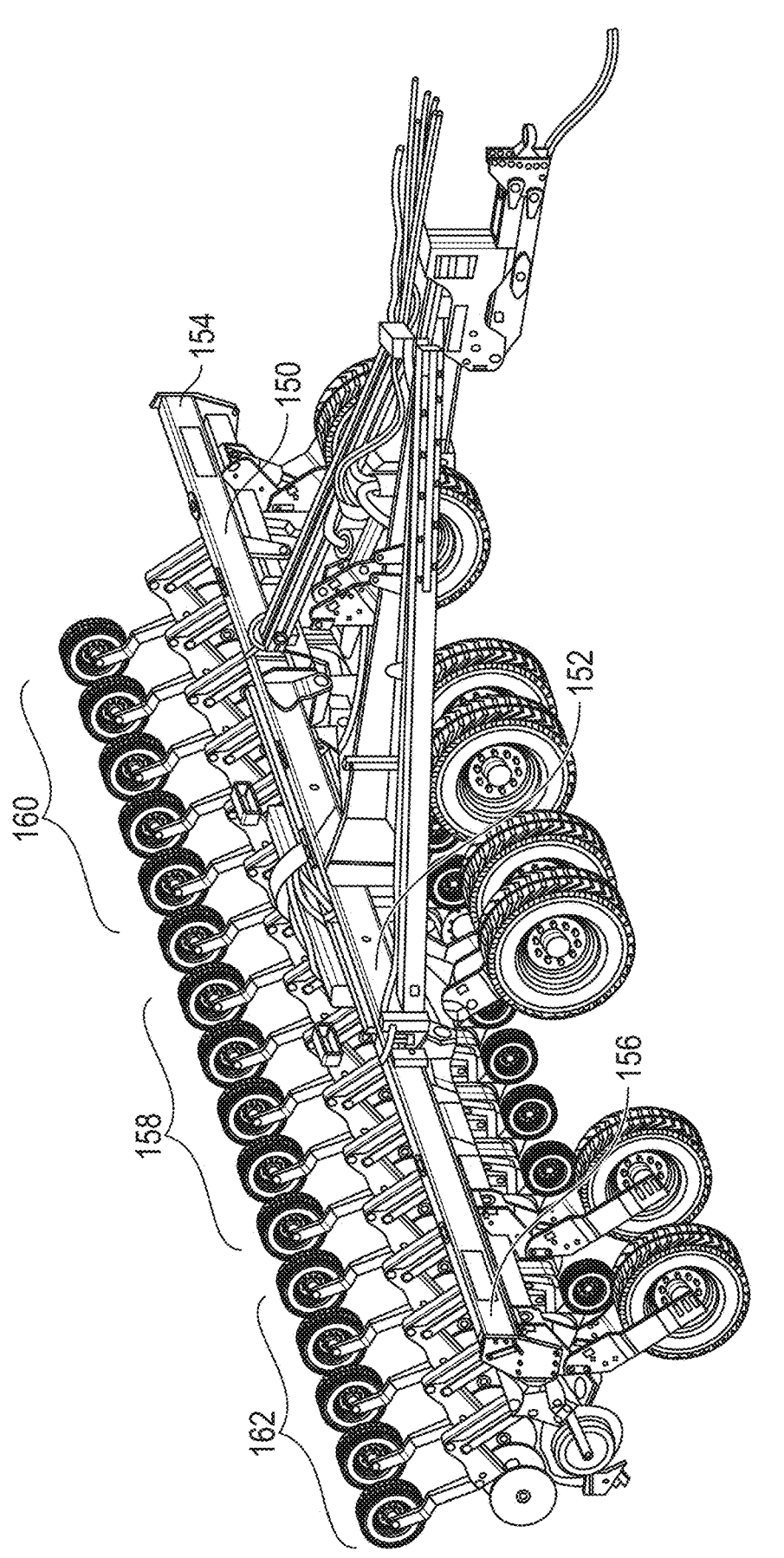
FIGS. 17A, 17B and 17C are perspective views of the striptill toolbar assembly with a row unit in a raised position.
Figure 17B:
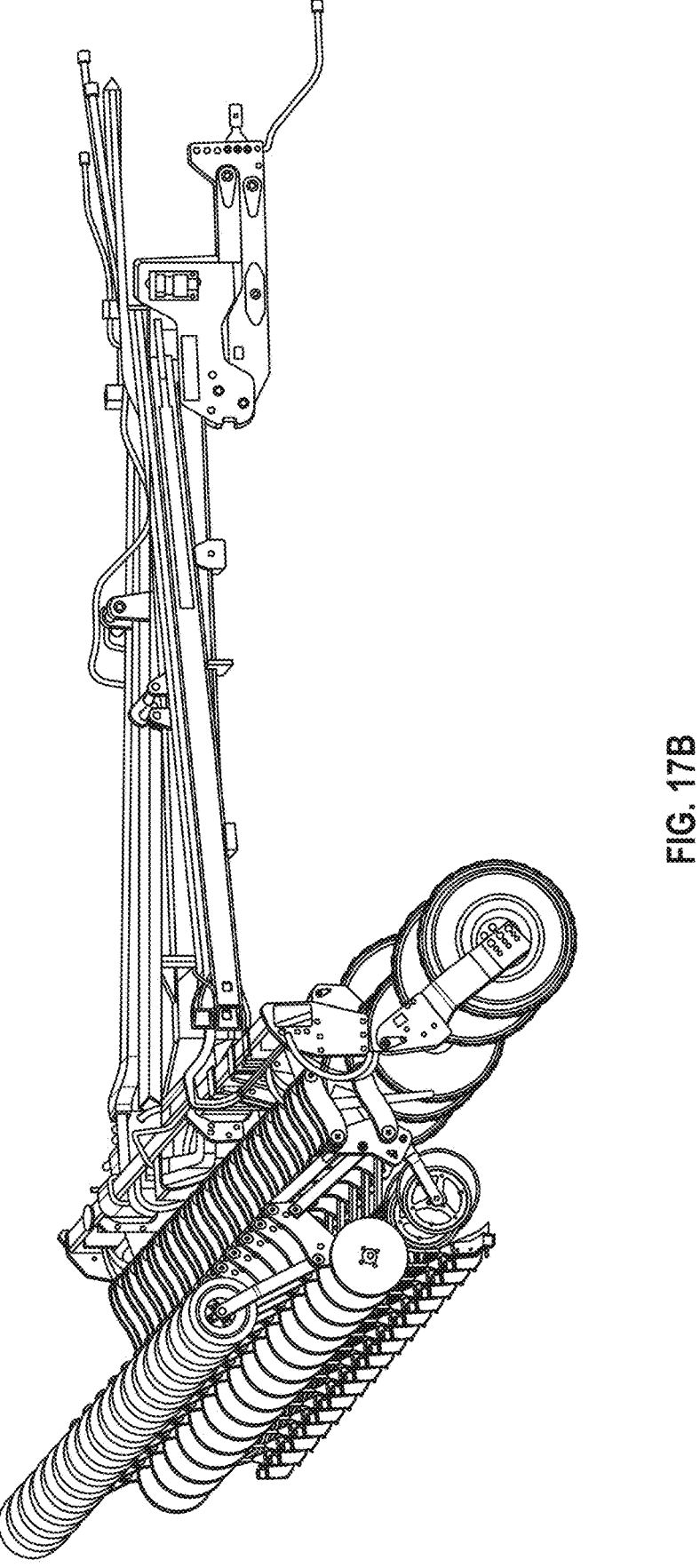
Figure 17C:
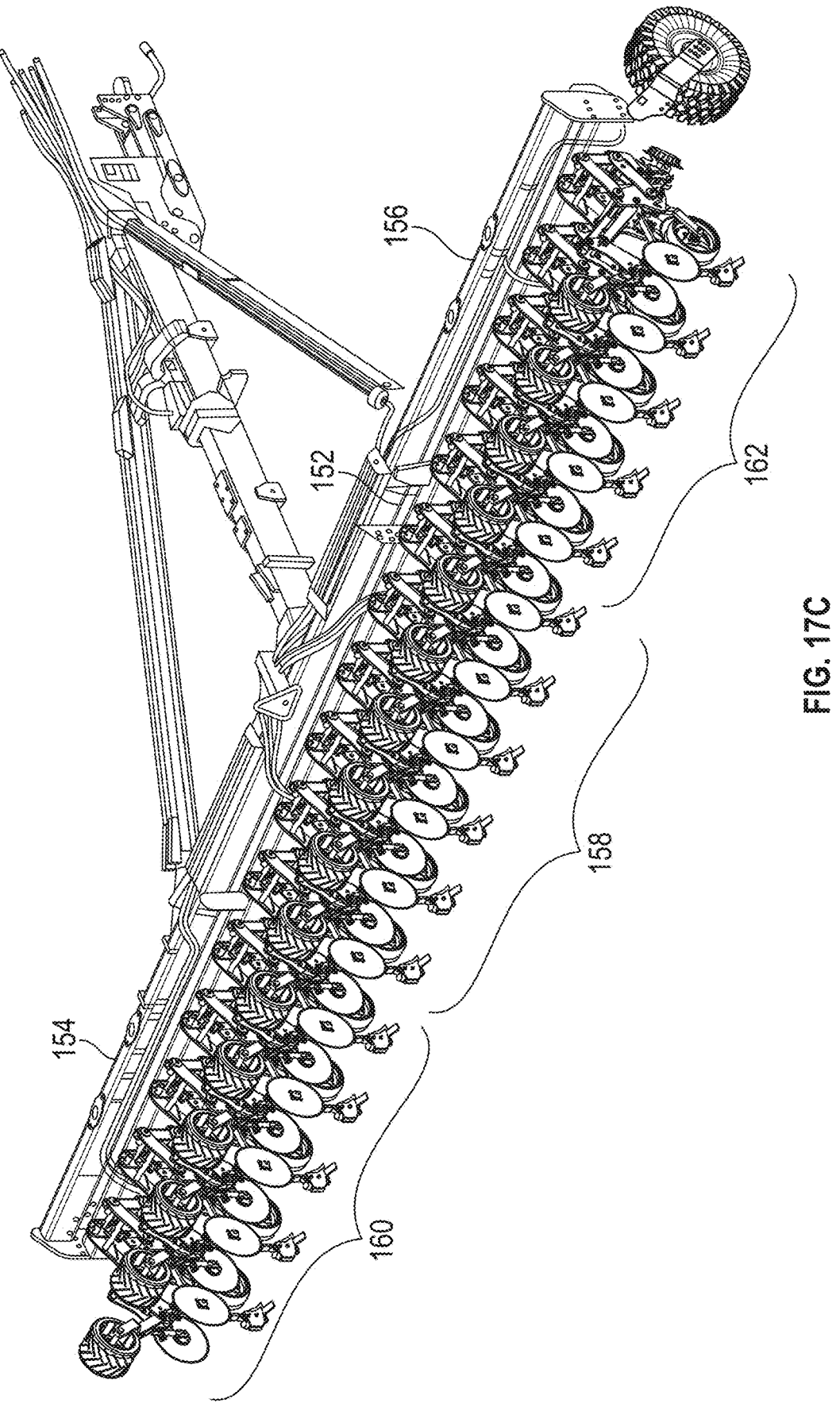
Figure 18A:
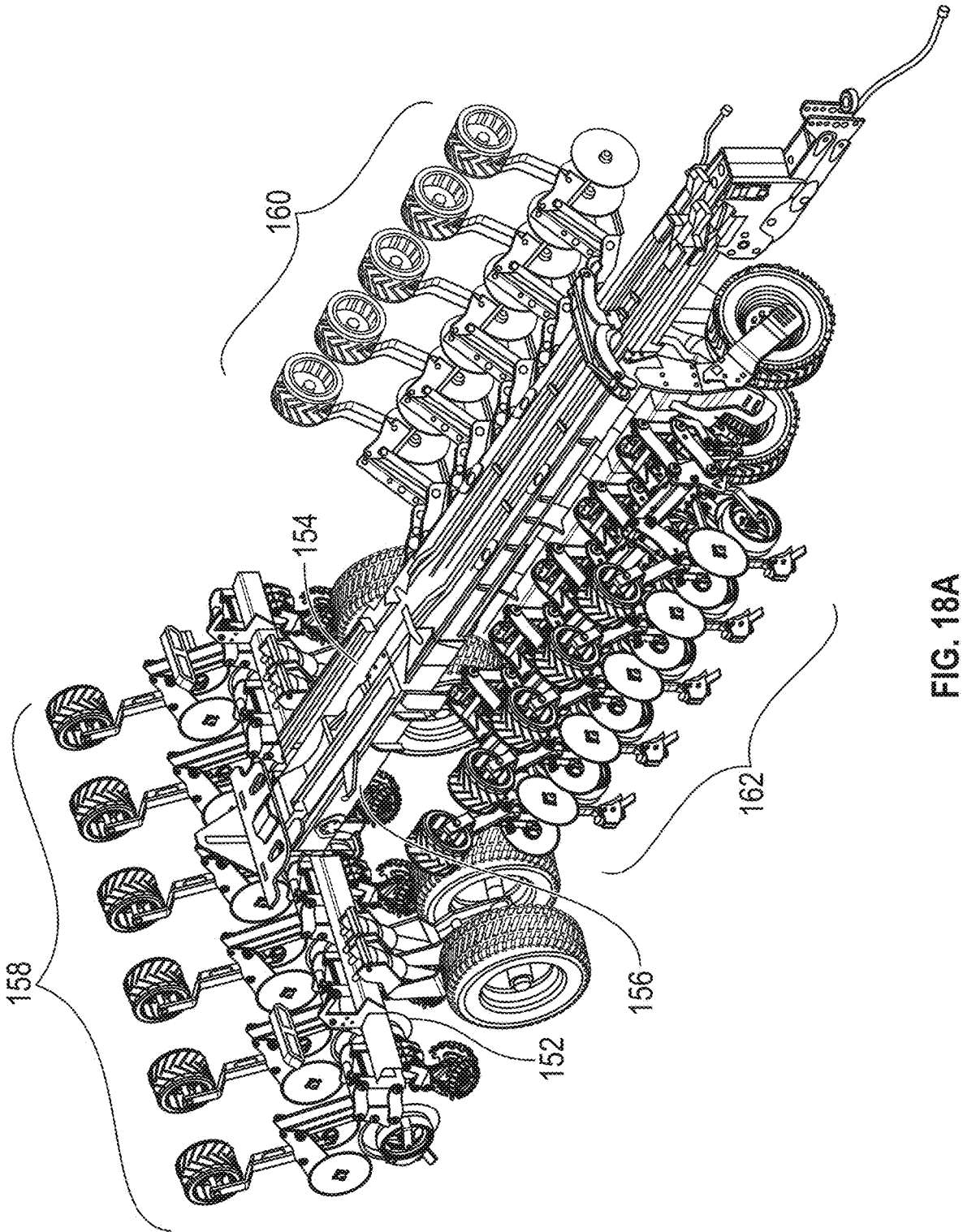
FIGS. 18A and 18B are perspective views of the striptill toolbar assembly with the row units in a raised position and the wings folded to a transport position.
Figure 18B:
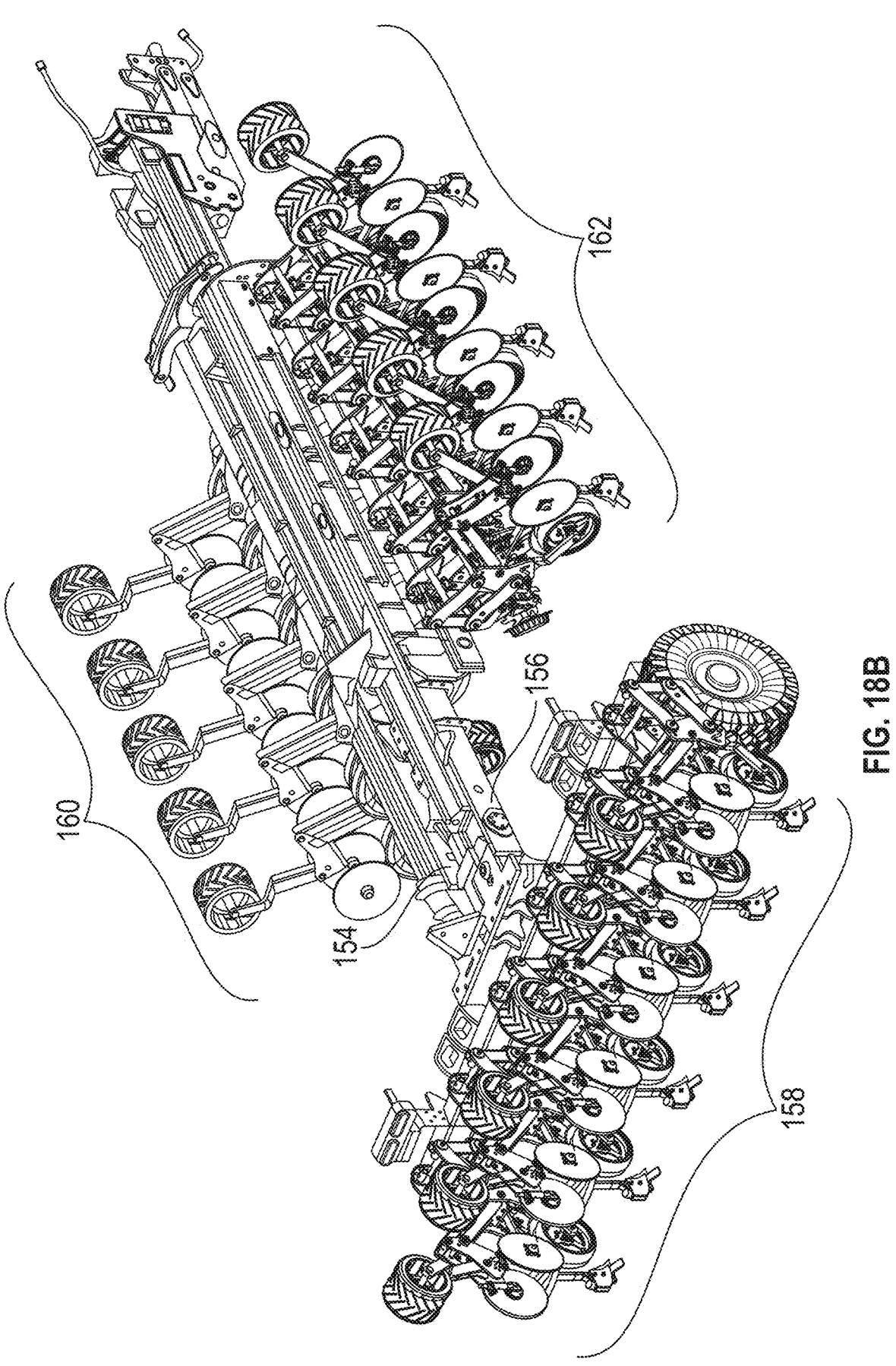
Figure 18C:
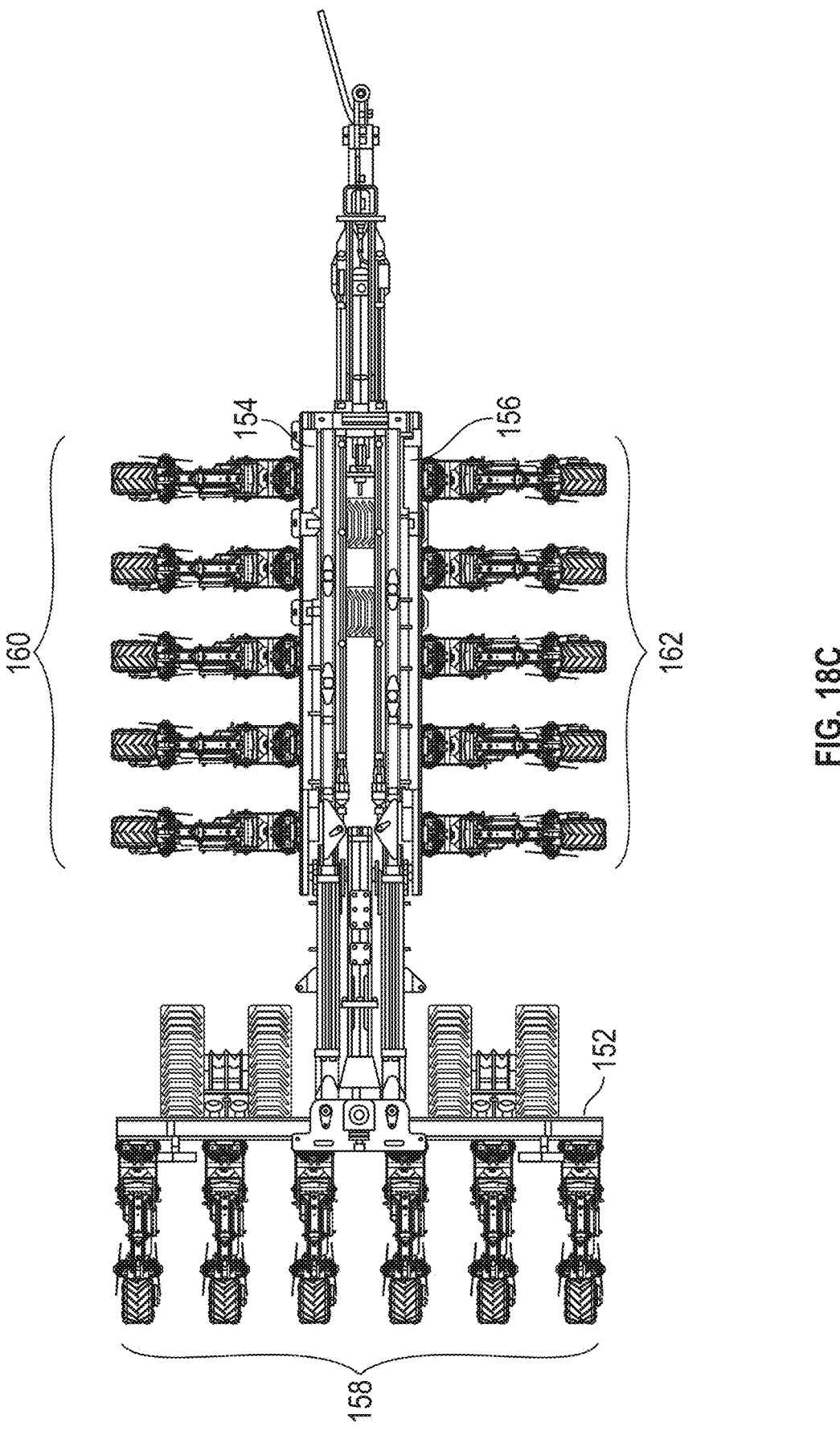
FIG. 18C is a top plan view of the assembly as shown in FIGS. 18A and 18B.

Each row unit is mounted to a toolbar 150 by the mounting bracket 30, such as by U-bolts extending around the toolbar and through holes in the mounting bracket or bolts and clamping plates 30. The toolbar 150 includes a center section 152, a left wing section 154, and a right wing section 156. Thus, the mounted row units form a center assembly 158, a left assembly 160, and a right assembly 162. The left and right wing sections 154, 156 of the toolbar 150 can be folded between field and transport positions when the row units are raised out of engagement with the ground. The field position with the row units lowered is shown in FIGS. 16A and 16B. The raised row units are shown on the unfolded toolbar 150 in FIGS. 7 and 8, 17B, and 17C. The raised row units are shown with the wing sections 154, 156 folded to the transport position in FIGS. 18A, 18B, and 19C. The folding of the wing sections 154, 156 can be done hydraulically, or by other actuation means, such as pneumatic or electric motors.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. An agricultural striptill row unit for tilling soil, comprising:
   a trash cleaner at a forward end of the row unit;
   a coulter assembly behind the trash cleaner;
   a knife behind the coulter assembly for applying fertilizer;
   berm discs behind the knife; and
   a firming wheel behind the berm discs at a rearward end of the row unit;
   the berm discs and firming wheel being foldable between a field position and a transport position;
   the firming wheel being foldable independently from folding of the berm discs;
   a first actuator to fold the berm discs, and a second actuator to fold the firming wheel; and
   a third actuator to control penetration of the coulter assembly and the knife into the soil.

2. The agricultural striptill row unit of claim 1 further comprising a fourth actuator to control up and down force of the striptill row unit.

3. The agricultural striptill row unit of claim 1 wherein the berm discs are adjustable vertically, laterally, and angularly.

4. The agricultural striptill row unit of claim 1 further comprising a gauge wheel associated with the coulter assembly to control depth of the coulter assembly in the soil.

5. The agricultural striptill row unit of claim 1 further comprising independent up/downforce systems for each of the coulter assembly, berm discs, and firming wheel.

6. The agricultural striptill row unit of claim 1 wherein the knife has opposing wings with leading edges extending substantially perpendicular to a line of travel for the striptill row unit.

* * * * *